US012078476B2

(12) United States Patent
Eisenberg

(10) Patent No.: US 12,078,476 B2
(45) Date of Patent: Sep. 3, 2024

(54) OPTICAL-BASED VALIDATION OF ORIENTATIONS OF INTERNAL FACETS

(71) Applicant: LUMUS LTD., Nes Ziona (IL)

(72) Inventor: Ido Eisenberg, Nes Ziona (IL)

(73) Assignee: LUMUS LTD., Nes Ziona (IL)

( * ) Notice: Subject to any disclaimer, the term of this patent is extended or adjusted under 35 U.S.C. 154(b) by 0 days.

(21) Appl. No.: 18/226,781

(22) Filed: Jul. 27, 2023

(65) Prior Publication Data
US 2023/0366675 A1 Nov. 16, 2023

Related U.S. Application Data

(62) Division of application No. 17/799,691, filed as application No. PCT/IL2021/051378 on Nov. 18, 2021, now Pat. No. 11,747,137.
(Continued)

(51) Int. Cl.
*G01B 11/26* (2006.01)
*G01C 9/06* (2006.01)
(Continued)

(52) U.S. Cl.
CPC .............. *G01B 11/26* (2013.01); *G01C 9/06* (2013.01); *G01M 11/0242* (2013.01); *G01C 2009/066* (2013.01); *G01N 2021/9511* (2013.01)

(58) Field of Classification Search
CPC ... G01N 2021/8477; G01N 2021/9511; G01N 33/381; G01N 33/385; G01N 33/386;
(Continued)

(56) References Cited

U.S. PATENT DOCUMENTS 7,420,691 B2 * 9/2008 Fukui ................ G11B 7/00375
356/630
9,322,785 B2 * 4/2016 Smith ..................... G01N 21/87
(Continued)

FOREIGN PATENT DOCUMENTS

CN 110207587 A * 9/2019 ............ G01B 11/00
JP H09304036 A * 11/1997
(Continued)

OTHER PUBLICATIONS

Erhui Qi et al "The Application of Pentaprism Scanning Technology on the Manufacturing of M3MP", published in Proceedings vol. 9682, 8th International Symposium on Advanced Optical Manufacturing and Testing Technologies: Large Mirrors and Telescopes; 96821A (2016) https://doi.org/10.1117/12.2245813 Event: Eighth International Symposium on Advanced Optical Manufacturing and Testing Technology (AOMATT2016), 2016, Suzhou, China.
(Continued)

*Primary Examiner* — Gordon J Stock, Jr.
(74) *Attorney, Agent, or Firm* — The Roy Gross Law Firm, LLC; Roy Gross

(57) ABSTRACT

Disclosed herein is a method including: providing a light guiding arrangement (LGA) configured to redirect light, incident thereon in a direction perpendicular to an external surface of the sample, into or onto the sample, such that light impinges on an internal facet of the sample nominally normally thereto; generating a first incident light beam (LB), directed at the external surface normally thereto, and a second incident LB, parallel to the first incident LB and directed at the LGA; obtaining a first returned LB by reflection of the first incident LB off the external surface, and a second returned LB by redirection by the LGA of the second incident LB into or onto the sample, reflection thereof off the internal facet, and inverse redirection by the LGA; measuring an angular deviation between the returned
(Continued)

LBs and deducing therefrom an actual inclination angle of the internal facet relative to the external surface.

20 Claims, 15 Drawing Sheets

Related U.S. Application Data

(60) Provisional application No. 63/115,151, filed on Nov. 18, 2020.

(51) Int. Cl.
*G01M 11/02* (2006.01)
*G01N 21/95* (2006.01)

(58) Field of Classification Search
CPC .... G01N 21/87; G01N 21/95; G01N 21/9515; G01N 21/958; G01M 11/00; G01M 11/005; G01M 11/0242; G01M 11/0278; G01B 11/26; G01B 11/27; G01B 11/272; G01C 2009/066; G01C 9/00; G01C 9/02; G01C 9/04; G01C 9/06
See application file for complete search history.

(56) References Cited

U.S. PATENT DOCUMENTS

| | | | |
|---|---|---|---|
| 9,709,809 B2 | 7/2017 | Miyawaki et al. | |
| 10,175,141 B2 | 1/2019 | Franz | |
| 10,198,865 B2 | 2/2019 | Kezele et al. | |
| 11,747,137 B2* | 9/2023 | Eisenberg | G01B 11/26 356/138 |
| 2003/0063293 A1 | 4/2003 | Kitabayashi et al. | |
| 2003/0165017 A1 | 9/2003 | Amitai | |
| 2007/0159673 A1 | 7/2007 | Freeman et al. | |
| 2012/0243002 A1 | 9/2012 | Yu | |
| 2013/0120224 A1 | 5/2013 | Cajigas et al. | |
| 2016/0062119 A1 | 3/2016 | Fitch et al. | |
| 2016/0278695 A1 | 9/2016 | Wang et al. | |
| 2016/0282616 A1 | 9/2016 | Matsushita | |
| 2017/0227764 A1 | 8/2017 | Kim et al. | |
| 2017/0363799 A1 | 12/2017 | Ofir et al. | |
| 2019/0258054 A1 | 8/2019 | Yoon | |

FOREIGN PATENT DOCUMENTS

| | | | | |
|---|---|---|---|---|
| JP | 2003232623 A | * | 8/2003 | |
| JP | 6268884 B2 | | 1/2018 | |
| WO | WO-02099359 A1 | * | 12/2002 | G01B 11/26 |
| WO | 2019131277 A1 | | 7/2019 | |

OTHER PUBLICATIONS

Klaus Ehrmann "Optical Power Mapping Using paraxial laser Scaning" in https://biomedicaloptics.spiedigitallibrary.org/conference-proceedings-of-spie/7163/71631E/Optical-power-mapping-using-paraxial-laser-scanning/10.1117/12.806765.short.

Jinying Li et al "Improvement of pointing accuracy for Risley prisms by parameter identification" in Applied Optics vol. 56 Issue: 26 pp. 7358-7366 DOI: 10.1364/AO.56.007358 Published: Sep. 10, 2017.

Wei Chen et al "An Image Quality Evaluation Method of Near-eye Display" in https://www.semanticscholar.org/paper/79-2%3A-An-Image-Quality-Evaluation-Method-of-Display-Chen-Xiao/384b34895321f6c9cda9e4cd7e87c3393a492bb5.

International Preliminary report on patentability (IPRP) May 16, 2023.

* cited by examiner

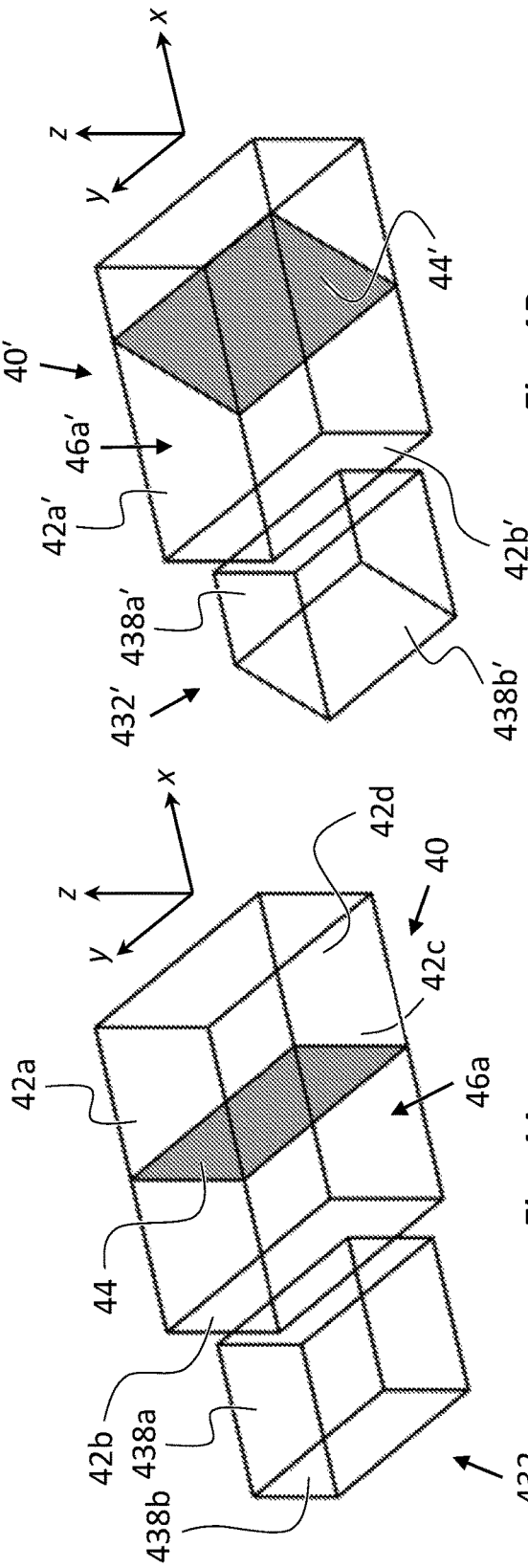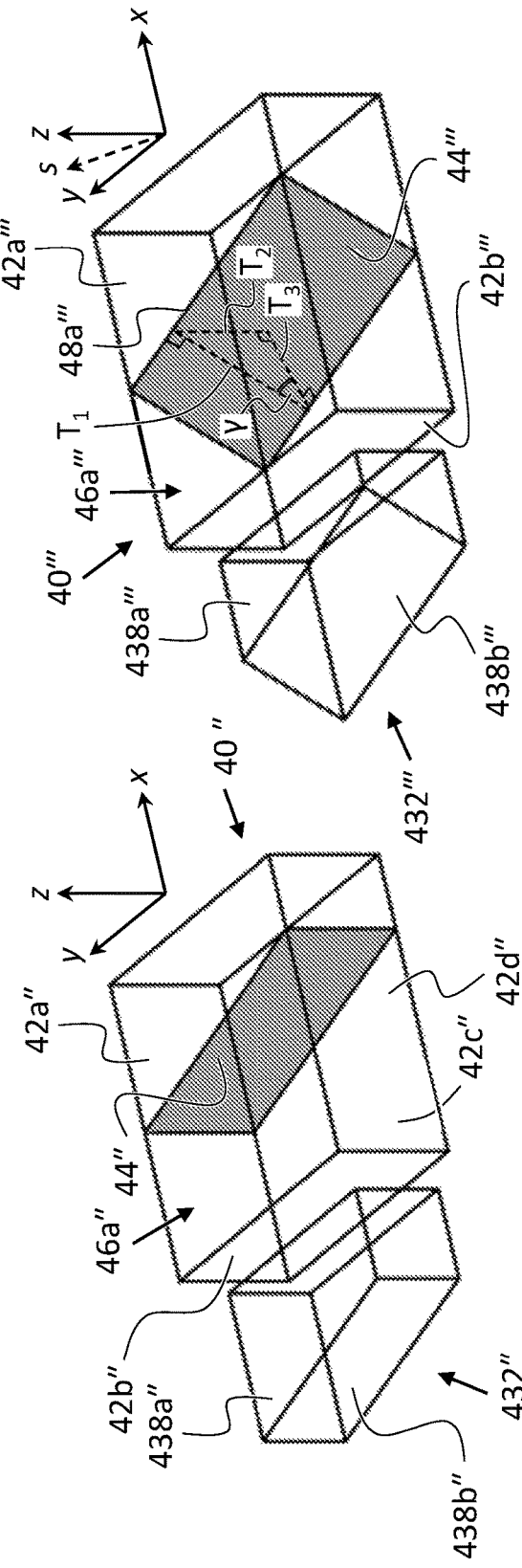
Fig. 4A
Fig. 4B
Fig. 4C
Fig. 4D

```
┌─────────────────────────────────────────────────────────────┐
│ Providing a sample to be tested including an external, flat │
│ first surface, an external second surface, an external,    │
│ flat third surface, parallel to the first surface, and an  │
│ internal facet nominally inclined at 90° relative to the   │
│ first surface.                                              │
└─────────────────────────────────────────────────────────────┘
                              │  ╰─ 805
                              ▼
┌─────────────────────────────────────────────────────────────┐
│ Generating a first incident LB, directed at the first       │
│ surface normally thereto, and a second incident LB,        │
│ parallel to the first incident LB and directed at the LGA. │
└─────────────────────────────────────────────────────────────┘
                              │  ╰─ 810
                              ▼
┌─────────────────────────────────────────────────────────────┐
│ Obtaining a first returned LB by reflection of the first    │
│ incident LB off the first surface.                          │
└─────────────────────────────────────────────────────────────┘
                              │  ╰─ 815
                              ▼
┌─────────────────────────────────────────────────────────────┐
│ Obtaining a second returned LB by redirection by the LGA   │
│ of the second incident LB into or onto the sample,         │
│ reflection thereof off the internal facet after nominally  │
│ normally impinging thereon, and inverse redirection by the │
│ LGA.                                                        │
└─────────────────────────────────────────────────────────────┘
                              │  ╰─ 820
                              ▼
┌─────────────────────────────────────────────────────────────┐
│ Measuring a first angular deviation of the second returned │
│ LB relative to the first returned LB.                       │
└─────────────────────────────────────────────────────────────┘
                              │  ╰─ 825
                              ▼
┌─────────────────────────────────────────────────────────────┐
│ Flipping the sample so as to invert the first and third     │
│ surfaces.                                                   │
└─────────────────────────────────────────────────────────────┘
                              │  ╰─ 830
                              ▼
┌─────────────────────────────────────────────────────────────┐
│ Generating a third incident LB, directed at the third       │
│ surface normally thereto, and a fourth incident LB,        │
│ parallel to the third incident LB and directed at the LGA. │
└─────────────────────────────────────────────────────────────┘
                              │  ╰─ 835
                              ▼
                              ⋮
```

OPTICAL-BASED VALIDATION OF ORIENTATIONS OF INTERNAL FACETS

TECHNICAL FIELD

The present disclosure relates generally to methods and systems for metrology of samples including internal facets.

BACKGROUND

Some transparent optical elements, such as glass prisms and waveguides, may include reflective, internal facets. In order to validate to high precision the orientation of such a facet relative to one or more external surfaces of the optical element, current state-of-the-art techniques require high-end optical components and implementation of complex alignment and calibration procedures. There is thus an unmet need in the art for simple and easily implementable metrology techniques, which avoid the use of high-end optical components, thereby addressing mass production demands.

SUMMARY

Aspects of the disclosure, according to some embodiments thereof, relate to methods and systems for metrology of samples including one or more internal facets. More specifically, but not exclusively, aspects of the disclosure, according to some embodiments thereof, relate to optical-based methods and systems for metrology of samples including one or more internal facets.

Advantageously, the present application discloses fast, simple, and precise methods and systems for validating the inclination of an internal facet of a sample, or a plurality of nominally parallel internal facets of a sample, relative to one or more external, flat surfaces of the sample.

Thus, according to an aspect of some embodiments, there is provided an optical-based method for validating an orientation of one or more internal facets of a sample relative to an external, flat surface thereof. The method includes:

Providing a sample including an external, flat first surface and an internal facet nominally inclined (intended by design and fabrication to be inclined) at a nominal inclination angle $\mu$ relative to the first surface.

Providing a light guiding arrangement (LGA) configured to redirect light, which is incident on the LGA in a direction perpendicular to the first surface, into or onto the sample, such that light, transmitted thereby into the sample, impinges on the internal facet nominally normally to the internal facet.

Generating a first incident light beam (LB), directed at the first surface normally thereto, and a second incident LB, parallel to the first incident LB and directed at the LGA.

Obtaining a first returned LB by reflection of the first incident LB off the first surface.

Obtaining a second returned LB by redirection by the LGA of the second incident LB into or onto the sample, reflection thereof off the internal facet, and inverse redirection by the LGA.

Measuring a first angular deviation of the second returned LB relative to the first returned LB.

Deducing an actual inclination angle of the internal facet relative to the first surface, based at least on the measured first angular deviation.

According to some embodiments of the method, the sample includes a first part and a second part, between which the internal facet extends. The first part is positioned between an external second surface of the sample and the internal facet. A transmitted LB, which constituting a portion of the second incident LB, is directly or indirectly transmitted into the sample, and enters into the sample via the second surface.

According to some embodiments of the method, the LGA includes a light folding component (LFC) nominally configured to fold light, at least when projected thereon in a direction perpendicular to the first surface, at a light folding angle equal to the nominal inclination angle.

According to some embodiments of the method, the LFC is or includes a prism, one or more mirrors, and/or a diffraction grating.

According to some embodiments of the method, the light folding angle is insensitive to variations in a pitch of the LFC.

According to some embodiments of the method, the LFC is or includes a pentaprism or a like-function prism, or a pair of mirrors set at an angle relative to one another, or a like-function mirror arrangement.

According to some embodiments of the method, the LGA further includes a coupling infrastructure configured to guide the light, folded by LFC, onto or into the sample, such that light, transmitted thereby into the sample, nominally normally impinges on the internal facet.

According to some embodiments of the method, the coupling infrastructure includes a coupling prism (CP). The CP includes an external, flat CP first surface, an external, flat CP second surface, nominally inclined at the nominal angle relative to the CP first surface, and an external CP third surface, opposite the CP second surface. The CP has a same refractive index as the first part of the sample or a refractive index close to (e.g. to within 0.001%, 0.01%, or even 0.1%, each possibility corresponds to separate embodiments) that of the first part of the sample. The CP is disposed such that the CP first surface is parallel to the first surface of the sample, and is further oriented such that the light, folded by the LFC, nominally normally impinges on the CP second surface.

According to some embodiments of the method, the coupling infrastructure further includes a shape-conforming interface. The shape-conforming interface is disposed between the CP third surface and the sample and has been made to assume a shape such that the CP first surface is parallel to the first surface of the sample.

According to some embodiments of the method, the shape-conforming interface has a same refractive index as the first part of the sample or a refractive index close to (e.g. to within 0.001%, 0.01%, or even 0.1%, each possibility corresponds to separate embodiments) that of the first part of the sample.

According to some embodiments of the method, the shape-conforming interface is or includes a liquid and/or a gel.

According to some embodiments of the method, the sample may be a prism, a waveguide, or a beam splitter.

According to some embodiments of the method, the first incident LB and the second incident LB constitute complementary portions of a single collimated light beam or are prepared by blocking off one or more parts of a single collimated light beam.

According to some embodiments of the method, the first incident LB and the second incident LB are prepared by blocking one or more portions of a single collimated LB.

According to some embodiments of the method, the single collimated LB is polychromatic.

According to some embodiments of the method, the single collimated LB is a laser beam.

According to some embodiments of the method, wherein the coupling infrastructure includes the CP, the method further includes an initial calibration stage wherein a gold standard sample is utilized to calibrate orientations of the LFC, the CP, and/or the sample.

According to some embodiments of the method, wherein the coupling infrastructure includes the CP, the method further includes generating an additional incident LB, which is directed at the CP first surface and in parallel to the first incident LB. An orientation of the CP is (a) calibrated and/or (b) tested for correct orientation during the measurement of the first angular deviation, by measuring an additional angular deviation of an additional returned LB relative to the first returned LB. The additional returned LB is obtained by reflection of the additional incident LB off the first CP surface.

According to some embodiments, the first angular deviation is obtained from measured coordinates of a first spot and a second spot formed by the first returned LB and the second returned LB, respectively, on a photosensitive surface of a light sensor.

According to some embodiments of the method, the first angular deviation is measured using an autocollimator.

According to some embodiments of the method, the measured first angular deviation is equal to $\Delta u/f$. $\Delta u$ is a difference between a coordinate of a first spot and a corresponding coordinate of a second spot on a photosensitive surface of the autocollimator. $f$ is a focal length of a collimating lens of the autocollimator. The first spot is formed by the first returned LB and the second spot is formed by the second returned LB.

According to some embodiments of the method, wherein the coupling infrastructure includes the CP, the actual inclination angle of the internal facet relative to the first surface is obtained from the measured first angular deviation, and the values of the actual inclination angle of the CP second surface relative to the CP first surface, and the refractive index of the first part of the sample, and, optionally, the actual light folding angle of the LFC.

According to some embodiments of the method, the method further includes measuring the actual light folding angle of the LFC.

According to some embodiments of the method, wherein the coupling infrastructure includes the CP, the method further includes measuring the actual inclination angle of the CP second surface relative to the CP first surface.

According to some embodiments of the method, the nominal inclination angle is obtuse.

According to some embodiments of the method, the nominal inclination angle is acute.

According to some embodiments of the method, the nominal inclination angle is 90° and the sample includes an external third surface, which is flat and parallel to the first surface of the sample. The method further includes, following the measuring of the first angular deviation:

Flipping the sample, so as to invert the first and third surfaces.

Generating a third incident LB, directed at the third surface perpendicularly thereto, and a fourth incident LB, parallel to the third incident LB and directed at the LGA.

Obtaining a third returned LB by reflection of the third incident LB off the second surface.

Obtaining a fourth returned LB by redirection by the LGA of the second incident LB into or onto the sample, reflection thereof off the internal facet, and inverse redirection by the LGA.

Measuring a second angular deviation of the fourth returned LB relative to the third returned LB.

Deducing an actual inclination angle between the first external surface and the internal facet, based on the measured first angular deviation and the measured second angular deviation.

According to some embodiments of the method, wherein the coupling infrastructure includes the CP, the CP further includes a CP fourth surface opposite and parallel to the CP first surface. The flipping the sample is accompanied by flipping of the CP, such that the CP first surface and CP fourth surface are inverted while maintaining a nominal orientation of the CP second surface relative to the sample.

According to some embodiments of the method, an uncertainty in the parallelism of the first surface of the sample and the third surface of the sample is smaller, or even significantly smaller (e.g. by an order of a magnitude or more), than a required measurement precision of the actual inclination angle. According to some embodiments of the method, wherein the coupling infrastructure includes the CP, the actual inclination angle of the internal facet relative to the first surface is obtained from the measured first angular deviation, and the values of the actual inclination angle of the CP second surface relative to the CP first surface and the refractive index of the first part of the sample.

According to some embodiments of the method, wherein the coupling infrastructure includes the CP, the actual inclination angle is equal to, or about equal to, $90°+(\delta_1-\delta_2)/(4n)+\Delta\mu^m\cdot(n-1)/n$ (e.g. the deduced actual inclination angle is between $90°+0.95\cdot[(\delta_1-\delta_2)/(4n)+\Delta\mu^m\cdot(n-1)/n)]$ and $90°+1.05\cdot[(\delta_1-\delta_2)/(4n)+\Delta\mu^m\cdot(n-1)/n)]$, between $90°+0.9\cdot[(\delta_1-\delta_2)/(4n)+\Delta\mu^m\cdot(n-1)/n)]$ and $90°+1.1\cdot[(\delta_1-\delta_2)/(4n)+\Delta\mu^m(n-1)/n)]$, or even between $90°+0.8\cdot[(\delta_1-\delta_2)/(4n)+\Delta\mu^m\cdot(n-1)/n)]$ and $90°+1.2\cdot[(\delta_1-\delta_2)/(4n)+\Delta\mu^m(n-1)/n)]$, each possibility corresponds to separate embodiments). $\delta_1$ and $\delta_2$ are the measured first angular deviation and the measured second angular deviation, respectively. $n$ is a refractive index of the first part of the sample. $\Delta\mu^m$ is a deviation from 90° in an inclination of the CP second surface relative to the CP first surface. Advantageously, according to some such embodiments, knowledge or measurement of the deviation of the actual light folding angle of the LFC from nominal inclination angle thereof is not required.

According to some embodiments of the method, the internal facet extends until the first surface of the sample.

According to some embodiments of the method, the sample includes $k \geq 1$ additional internal facets nominally parallel to the internal facet. In the obtaining of the second returned LB, k additional returned LBs are obtained by reflection of k LBs off of each of the k additional internals facets, respectively. The k LBs constitute a portion of the second incident LB, transmitted into the sample and further transmitted via the internal facet. In the measuring of the first angular deviation, k additional angular deviations of the k additional returned LBs relative to the first returned LB are measured. In deducing the actual inclination angle $\mu'$ of the internal facet, (i) k additional actual inclination angles of each of the k additional internal facets are additionally deduced, and/or (ii) an average actual inclination angle equal to, or about equal to, an average over the actual inclination angles of internal facet and the k additional internal facets, is deduced. The average actual inclination angle is indicative of the actual inclination angle $\mu'$ of the internal facet.

According to some embodiments of the method, k≥2. A first of the additional internal facets is positioned between the internal facet and a second of the additional internal facets. For each m such that 2≤m≤k−1, an m-th of the k additional internal facets is positioned between an (m−1)-th and an (m+1)-th of the k additional internal facets. According to some such embodiments, each of k+1 spots formed on a photosensitive surface of a light or image sensor by the second returned LB and the k additional returned LBs, respectively, may be attributed to (i.e. identified as formed by) the respective returned LB based on the brightness of the spots. The brightest of the k+1 spots may be attributed to the second returned LB, and for each j, such that 2≤j≤k+1, a j-th brightest spot may be attributed to the returned LB induced by reflection off the (j−1)-th of the k additional internal facets.

According to some embodiments of the method, each of the internal facet and the k additional internal facets is configured to reflect light at a respective spectrum. Each spectrum is distinct from the other spectra, so as to allow distinguishing between each of the second returned LB and the k additional returned LBs.

According to an aspect of some embodiments, there is provided an optical-based system for validating an orientation of an internal facet of a sample relative to an external, flat surface of the sample. The system includes:

A light guiding arrangement (LGA) configured to redirect light, which is incident on the LGA in a direction perpendicular to an external and flat first surface of a sample, into or onto the sample, such that light, transmitted thereby into the sample, impinges on an internal facet of the sample nominally normally to the internal facet.

An illumination and collection arrangement (ICA) including:

A light generation assembly configured to (a) project a first incident light beam (LB) on the first surface, so as to generate a first returned LB by reflection off the first surface, and (b) project a second incident LB on the LGA, in parallel to the first incident LB, so as generate a second returned LB, by redirection by the LGA of the second incident LB into or onto the sample, reflection thereof off the internal facet, and inverse redirection by the LGA.

At least one sensor, configured to measure a first angular deviation of the second returned LB relative to the first returned LB, and/or an eyepiece assembly configured to enable manually measuring the first angular deviation.

The measured first angular deviation is indicative of an actual inclination angle of the internal facet relative to the first surface.

According to some embodiments of the system, the light generation assembly includes a light source and optical equipment.

According to some embodiments of the system, the at least one sensor includes one or more light sensors and/or one or more image sensors (e.g. one or more cameras).

According to some embodiments of the system, the sample includes a first part and a second part, between which the internal facet extends. The first part is positioned between an external second surface of the sample and the internal facet. The LGA is configured to redirect the LGA into or onto the first part via the second surface.

According to some embodiments of the system, the LGA includes a light folding component (LFC) nominally configured to fold light, at least when projected thereon in a direction perpendicular to the first surface, at a light folding angle equal to the nominal inclination angle.

According to some embodiments of the system, the LFC is or includes a prism, one or more mirrors, and/or a diffraction grating.

According to some embodiments of the system, the light folding angle of the LFC is insensitive to variations in a pitch of the LFC.

According to some embodiments of the system, the LFC is or includes a pentaprism or a like-function prism, or a pair of mirrors set at an angle relative to one another or a like-function mirror arrangement.

According to some embodiments of the system, the LGA further includes a coupling infrastructure configured to guide the light, folded by the LFC, onto or into to the sample, such that light, transmitted thereby into the sample, nominally normally impinges on the internal facet.

According to some embodiments of the system, the coupling infrastructure includes a coupling prism (CP), including an external, flat CP first surface, an external, flat CP second surface, nominally inclined at the nominal angle relative to the CP first surface, and an external CP third surface (which may be flat or not), opposite the CP second surface. The CP has a same refractive index as the first part of the sample or a refractive index close to (e.g. to within 0.001%, 0.01%, or even 0.1%, each possibility corresponds to separate embodiments) that of the first part of the sample. The CP is disposed such that the CP first surface is parallel to the first surface of the sample, and is further oriented such that the light, folded by the LFC, nominally normally impinges on the CP second surface.

According to some embodiments of the system, the coupling infrastructure further includes a shape-conforming interface. The shape-conforming interface is disposed between the CP third surface and the sample, such that the CP first surface is parallel to the first surface of the sample. The shape-conforming interface has a same refractive index as the first part of the sample or a refractive index close to (e.g. to within 0.001%, 0.01%, or even 0.1%, each possibility corresponds to separate embodiments) that of the first part of the sample.

According to some embodiments of the system, the shape-conforming interface is or includes a liquid and/or a gel.

According to some embodiments of the system, the sample may be a prism, a waveguide, or a beam splitter.

According to some embodiments of the system, wherein the LGA includes the at least one sensor, the system further includes a computational module configured to compute the actual inclination angle, based at least on the measured first angular deviation.

According to some embodiments of the system, the computational module is further configured to compute an uncertainty in the computed value of the actual inclination angle, taking into account at least manufacturing tolerances and imperfections of the LGA and the ICA.

According to some embodiments of the system, including the CP, the system further includes orienting infrastructure configured to orient the sample such that the first incident LB normally impinges on the first surface, and/or a folded LB, obtained by folding of the second incident LB by the LFC, nominally normally impinges on the CP second surface.

According to some embodiments of the system, the system further includes an autocollimator. The autocollimator includes the light source, the at least one sensor, and a collimating lens or collimating lens assembly.

According to some embodiments of the system, the ICA further includes at least two shutters configured to selectively block each of the incident LBs, and/or one or more spectral filters configured to at least facilitate distinguishing between the returned LBs.

According to some embodiments of the system, wherein the sample includes the first part and the second part, the nominal inclination angle is 90° and the sample further includes an external, flat third surface, which is parallel to the first surface.

According to some embodiments of the system, the system is configured to facilitate flipping the sample.

According to some embodiments of the system, including the at least one sensor and the computational module, the computational module is configured to compute the actual inclination angle additionally taking into account a measured second angular deviation of a fourth returned LB relative to a third returned LB. With the sample flipped, such that the first surface and the third surface are inverted: (a') The third returned LB is obtained by projecting a third incident light beam on the third surface of the sample, so as to generate the third returned LB by reflection off the third surface, and (b') and the fourth returned LB is obtained by projecting a fourth incident LB on the LFC, in parallel to the third incident LB, so as generate the fourth returned LB, by redirection by the LGA of the fourth incident LB into or onto the sample, reflection thereof off the internal facet, and inverse redirection by the LGA.

According to some embodiments of the system, including the CP, the CP further includes an external, flat CP fourth surface, which is parallel to the CP first surface. The CP is mechanically flippable, such that the CP first surface and the CP fourth surface may be inverted, while maintaining a nominal orientation of the CP second surface relative to the sample.

According to some embodiments of the system, the measured second angular deviation is obtained with the CP flipped, such that the CP first surface and the CP fourth surface are inverted and the nominal orientation of the CP second surface relative to the sample is maintained.

According to some embodiments of the system, wherein the system includes the orienting infrastructure, the computational module is configured to compute the uncertainty in the computed value of the actual inclination angle additionally taking into account manufacturing tolerances and imperfections of the orienting infrastructure.

According to some embodiments of the system, wherein the light generation assembly includes a light source and optical equipment, the light source is configured to generate a single LB, and the optical equipment is configured to collimate the single LB.

According to some embodiments of the system, the first incident LB and the second incident LB are complementary portions of the collimated LB.

According to some embodiments of the system, the light source is a polychromatic light source.

According to some embodiments of the system, the light source is configured to generate a laser beam.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIGS. 4A to 4D present non-limiting examples of samples, which may be subjected to internal facet metrology by the system of FIG. 1A, according to some embodiments;

FIGS. 8A and 8B present a flowchart of an optical-based method for validating perpendicularity of an internal facet of a sample with respect to two external, flat surfaces of the sample, which are parallel, according to some embodiments;

DETAILED DESCRIPTION

Figure 1A:
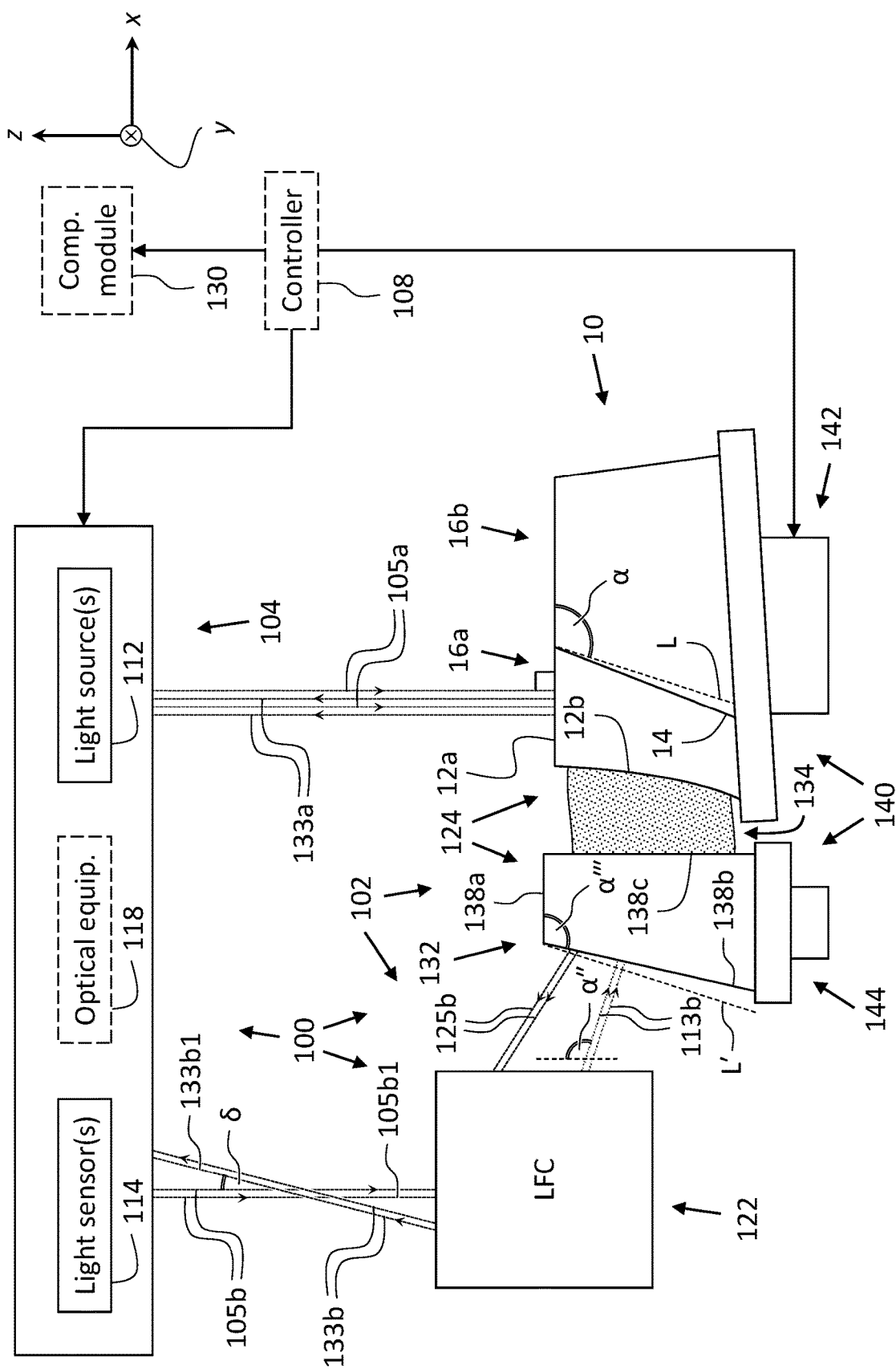
FIG. 1A schematically depicts an optical-based system for internal facet metrology of samples, during inspection of a sample, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

For ease of description, in some of the figures a three-dimensional cartesian coordinate system is introduced. It is noted that the orientation of the coordinate system relative to a depicted object may vary from one figure to another. Further, the symbol ⊙ may be used to represent an axis pointing "out of the page", while the symbol ⓧ may be used to represent an axis pointing "into the page".

In the figures, optional elements and optional stages (in flowcharts) are delineated by a dashed line. Throughout the description, internal, flat surfaces (such as a flat boundary between two parts of a three-dimensional element or an internal flat layer of material incorporated into a three-dimensional element) of three-dimensional elements are referred to as "internal facets".

Systems

According to an aspect of some embodiments, there is provided an optical-based system for internal facet metrology of samples. FIG. 1A schematically depicts such a system, an optical-based system 100, according to some embodiments. Optical-based system 100 is configured for validating the angle between an internal facet of a sample and an external, flat surface of the sample. FIG. 1A presents a cross-sectional side-view of system 100 and a sample 10, according to some embodiments. (It is to be understood that sample 10 does not constitute a part of system 100.) Sample 10 is shown being inspected by system 100.

Sample 10 includes an external first surface 12a (i.e. a first external surface), an external second surface 12b (i.e. a second external surface), and an internal facet 14. First surface 12a is flat. The remaining external surfaces of sample 10 may be of any shape, for example, curved, so long as their shapes do not preclude positioning and orienting of sample 10, as elaborated on below. As a non-limiting example, second surface 12b is depicted as convex, but it is to be understood that second surface 12b may equally be flat, concave, or even wavy or rough (e.g. unpolished), or include a plurality of non-parallel flat surfaces. According to some embodiments, not depicted in FIG. 1A, sample 10 may be shaped as a polyhedron.

Sample 10 is composed at least of a first part 16a and a second part 16b. According to some embodiments, first part 16a and second part 16b share a common boundary, which is flat, and constituted by internal facet 14. In such embodiments, first part 16a and second part 16b are characterized by different refractive indices, respectively (i.e. a refractive index of first part 16a differs from a refractive index of second part 16b). As a non-limiting example, according to some such embodiments, the sample may be an element composed of two glass parts, which are characterized by two different refractive indices, respectively. Alternatively, according to some embodiments, first part 16a and second part 16b may be separated by a thin and flat layer of material, or several materials, formed by internal facet 14. The layer is characterized by a different refractive index than at least one of first part 16a and second part 16b (whose refractive indices may or may not be identical). According to some such embodiments, first part 16a and second part 16b may be made of the same material, for example, in embodiments wherein sample 10 is a prism or a waveguide and a flat layer (stratum) of material—having a different refractive index than that of first part 16a and/or second part 16b—is incorporated into sample 10 between first part 16a and second part 16b.

Figure 1B:
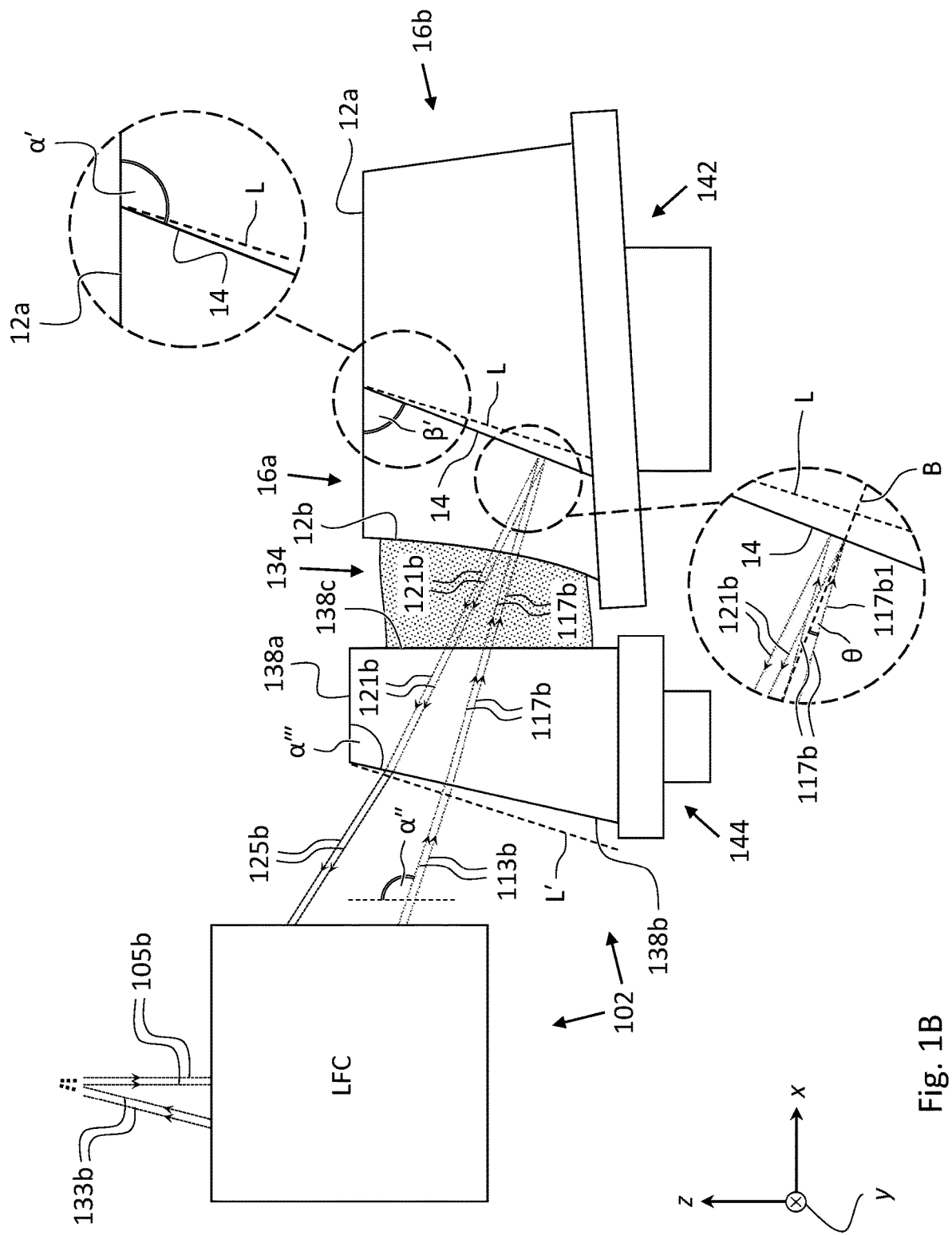
FIG. 1B schematically depicts trajectories of light beams inside a light guiding arrangement of the system and the sample, according to some embodiments.

Sample 10 is manufactured to exhibit a (nominal) inclination angle a (indicated in FIG. 1B) between first surface 12a and internal facet 14. However, due to fabrication imperfections an actual inclination angle $\alpha'$ between first surface 12a and internal facet 14 will generally differ from the nominal inclination angle $\alpha$. A straight (first) dashed line L is shown in FIG. 1A intersecting internal facet 14 and is inclined at the nominal inclination angle $\alpha$ relative to first surface 12a. The dashed line L indicates the intended inclination of internal facet 14. The nominal inclination angle $\alpha$ may be acute (i.e. $\alpha<90°$), obtuse (i.e. $\alpha>90°$), or equal to 90°. A supplementary angle to the actual inclination angle $\alpha'$, labelled as $\beta'$ (i.e. $\beta'=180°-\alpha'$), is indicated in FIG. 1B.

Beyond nominally being inclined at the inclination angle $\alpha$ relative at least one external, flat surface of sample 10, the orientation of internal facet 14 is, in principle not limited. Several different orientations of internal facets—whose (actual) inclination angles may be measured utilizing system 100—within samples sharing the same exterior geometry, are described below in the description of FIGS. 4A-4D.

According to some embodiments, first part 16a may be made of a transparent or semi-transparent material, while second part 16b may be made of a transparent material or a semi-transparent material, or even an opaque material. According to some embodiments, first part 16a may be made of glass or crystal (or even transparent or semi-transparent polymer or metal), while second part 16b may in principle be made of any material (including opaque materials). According to some embodiments, wherein first part 16a and second part 16b share a common boundary, first part 16a and second part 16b may be glued onto one another and/or fused (e.g. laser fused) onto another along the common boundary thereof.

According to some embodiments, system 100 includes a light guiding arrangement (LGA) 102 and an illumination and collection arrangement (or assembly; ICA) 104. System 100 may further include a controller 108 functionally associated with ICA 104 and configured to control operation thereof.

According to some embodiments, and as depicted in FIG. 1A, ICA 104 includes a light source 112 (or a plurality of light sources) and a sensor 114 (or a plurality of sensors). According to some alternative embodiments, not depicted in FIG. 1A, ICA 104 includes an eyepiece assembly in place of sensor 114, being thereby configured for visual determination (i.e. by eye) of the actual inclination angle.

As described in detail below, ICA 104 is configured to output at least two parallel light beams (LBs) including a first LB 105a (also referred to as "first incident LB"; indicated in FIG. 1A by a pair of parallel light rays) and a second LB 105b (also referred to as "second incident LB"; indicated in FIG. 1A by a pair of parallel light rays).

According to some embodiments, optical equipment 118 may be configured to collimate light generated by light source 112, and thereby produce the (parallel) incident LBs 105a and 105b. According to some such embodiments, optical equipment 118 may include a collimating lens or a collimating lens assembly (not shown). According to some embodiments, incident LBs 105a and 105b may form complementary portions of a collimated light beam (which has been focused by the collimating lens or collimating lens assembly). Alternatively, according to some embodiments, incident LBs 105a and 105b may be spaced apart (and parallel). According to some such embodiments, optical equipment 118, may further include one or more optical filters (e.g. a light absorbing filter or an opaque plate), and/or one or more beam splitters, and, optionally, one or more mirrors (not shown), configured to prepare from the collimated light beam a pair of spaced apart and parallel light beams.

According to some embodiments, optical equipment 118 may further include a plurality of blocking elements (such as the blocking elements depicted in FIG. 2) configured to allow selectively blocking each of incident LBs 105 or at least facilitate distinguishing between a first returned LB 133a, induced by first incident LB 105, and a second returned LB 133b, induced by second incident LB 105b. As used herein, the term "blocking element", with reference to an optical element, is be construed broadly as encompassing both controllably openable and closable opaque elements (such as shutters) configured to (when closed) block light beams incident thereon, and filtering elements (such as spectral filters) configured to block, whether fully or partially, one or more parts of an optical spectrum (e.g. the visible spectrum).

According to some embodiments, light source 112 may be configured to produce or allow producing polychromatic light. According to some such embodiments, the spectrum of the light may be controllable. According to some embodiments, light source 112 may be configured to produce or allow producing monochromatic light.

According to some embodiments, ICA 104 is or includes an autocollimator (i.e. light source 112, sensor 114, and some or all of optical equipment 118 constitute components of the autocollimator). According to some embodiments, incident LBs 105 constitute adjacent sub-beams of a single, broad, and collimated LB generated by the autocollimator. According to such embodiments, optical equipment 118 may include an optical filter configured to transmit two sub-beams (such as incident LBs 105) of the collimated LB, prepared by the autocollimator and incident on the optical filter (with the parallelism of the two sub-beams being maintained on emergence from the optical filter).

According to some embodiments, and as depicted in FIG. 1A, LGA 102 includes a light folding component 122 (LFC) and a coupling infrastructure 124, which may be disposed between LFC 122 and sample 10. LFC 122 is nominally configured to fold light, projected thereon in a direction perpendicular to first surface 12a, at a light folding angle $\alpha''$, which is equal to the nominal inclination angle $\alpha$. (That is, ideally, the light folding angle $\alpha''$ will be equal to the nominal inclination angle.)

Figure 3:
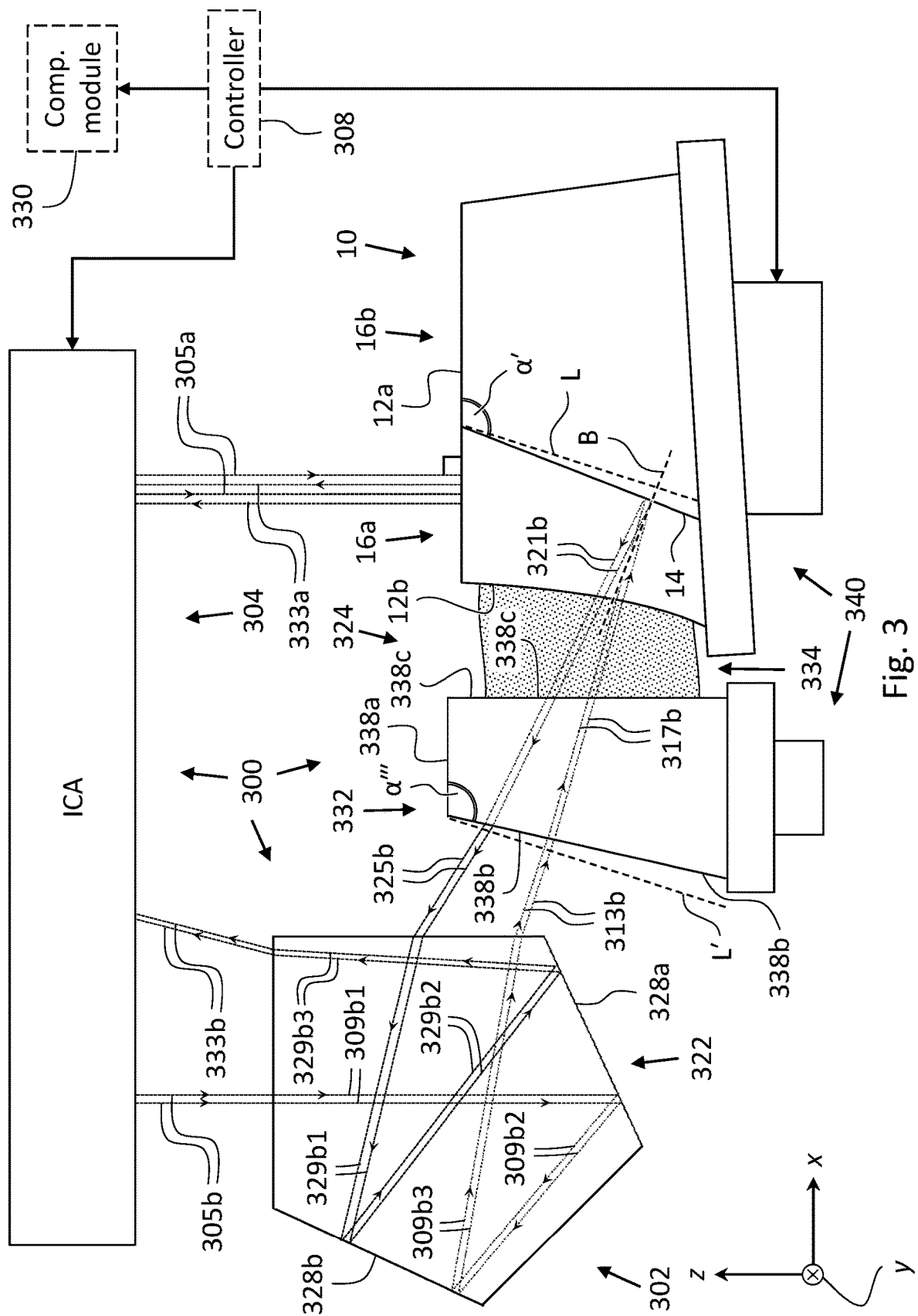
FIG. 3 schematically depicts an optical-based system for internal facet metrology of samples, during inspection of a sample, the system corresponds to specific embodiments of the system of FIG. 1A.

According to some embodiments, LFC 122 may be or include a prism, one or more mirrors, or a diffraction grating. According to some embodiments, LFC 122 may be a pentaprism (as depicted in FIG. 3) or a like-function prism that is insensitive to variations in pitch (in the sense that the light folding angle thereof remains unchanged when the pitch of LFC 122 is slightly changed, i.e. when LFC 122 is slightly rotated about the y-axis). According to some embodiments, LFC 122 may be a pair of mirrors set at an angle with respect to one another, or a like-function arrangement of mirrors (i.e. insensitive to variations in pitch).

In embodiments wherein internal facet 14 is (by design) not parallel to second surface 12b, additional infrastructure may be required to cause light—projected (outside of sample 10) on second surface 12b in a direction perpendicular to internal facet 14—to maintain the propagation direction thereof after entering into sample 10. The same may apply also when internal facet 14 and second surface 12b are nominally parallel, since—even if second surface 12b is sufficiently smooth—due to manufacturing tolerances, second surface 12b actual inclination will generally slightly differ from the nominal inclination. Coupling infrastructure 124 is configured to this end, as described below.

According to some embodiments, and as depicted in FIG. 1A, coupling infrastructure 124 may include a coupling prism (CP) 132 and a shape-conforming interface 134. CP 132 includes an external and flat (CP) first surface 138a, an external and flat (CP) second surface 138b, and an external (CP) third surface 138c (which may or may not be flat). CP second surface 138b is nominally inclined at the nominal inclination angle a relative to CP first surface 138a, as indicated by a second dashed line L', which is parallel to the first dashed line L. CP third surface 138c may be positioned opposite to CP first surface 138a.

According to some embodiments, shape-conforming interface 134 may be confined between second surface 12b (of sample 10) and CP third surface 138c, adjacently to each. Shape-conforming interface 134 may be a liquid, gel, or paste characterized by a surface tension and/or adhesive properties, such as to maintain integrity and disposition thereof when confined in a narrow space. According to some embodiments, shape-conforming interface 134 may be a malleable material. According to some embodiments, and as depicted in FIG. 1B, the refractive indices of CP 132 and shape-conforming interface 134 are each equal to, or close to (e.g. to within 0.001%, 0.01%, or even 0.1%, each possibility corresponds to separate embodiments), the refractive index of sample 10. According to some embodiments, the values of the refractive indices of CP 132 and shape-conforming interface 134 are sufficiently small such that the overall uncertainty in the measured value of the actual inclination angle α' does not exceed the required measurement precision. Thus, a light beam propagating through CP 132, shape-conforming interface 134, and sample 10, will maintain the propagation direction thereof on transitioning from CP 132 to shape-conforming interface 134 and on transitioning from shape-conforming interface 134 to sample 10.

According to some embodiments, system 100 may further include orienting infrastructure 140 for orientating sample 10 relative to ICA 104. As a non-limiting example, orienting infrastructure 140 may include an orientable (first) stage 142 (i.e. a first stage, which may be oriented), which is configured for motion in six degrees of freedom. Stage 142 is configured for mounting thereon a sample, such as sample 10. In particular, orienting infrastructure 140 may be configured to orient sample 10, such that first incident LB 105a will perpendicularly impinge on first surface 12a. According to some embodiments, orienting infrastructure 140 may be functionally associated with controller 108 and is configured to be controlled thereby.

According to some embodiments, orienting infrastructure 140 may be further configured to orient CP 132 relative to LGA 102, ICA 104, and sample 10. According to some such embodiments, orienting infrastructure 140 may include an orientable second stage 144, which is configured to have placed thereon CP 132 and to rotate CP 132 along each of three non-parallel axes, and, optionally, translate CP 132.

As used herein, according to some embodiments, the terms "nominally" and "ideally" may be interchangeable. An object may be said to "nominally" exhibit (i.e. be characterized by) an intrinsic property, such as an inclination angle between flat surfaces of the sample, when the object is intended by design and fabrication to exhibit the property but, in practice, due to manufacturing tolerances, the object may actually only imperfectly exhibit the property. The same applies to an extrinsic property of an object, such as the light propagation direction of a light beam. In this case, it is to be understood that the object has intentionally been prepared, or otherwise manipulated, to ideally exhibit the property but, in practice, due to inherent imperfections, e.g. in a setup used for the preparation, the object may actually only imperfectly exhibit the property.

In operation, first incident LB 105a is projected on sample 10, normally to first surface 12a, and second incident LB 105b is projected on LFC 122. First incident LB 105a (or at least a portion thereof) is reflected off first surface 12a—as indicated by first returned LB 133a—and is sensed by sensor 114.

Second incident LB 105b is folded by LFC 122 at the light folding angle α", as indicated by a folded LB 113b. The light folding angle α' is nominally equal to the nominal inclination angle α. However, in practice, due to manufacturing imperfections, the light folding angle α" of LFC 122 may slightly deviate from the nominal inclination angle α. When the uncertainty in the light folding angle (due to the manufacturing tolerance) of LFC 122 is lower, or significantly lower, than the accuracy to which the actual inclination angle of internal facet 14 is to be determined, the uncertainty in the light folding angle may be neglected (i.e. LFC 122 may be assumed to fold second incident LB 105b at precisely the nominal inclination angle α). Otherwise, the uncertainty in the light folding angle may contribute (non-negligibly) to the overall uncertainty in the measured value of the actual inclination angle.

In order to keep the figures uncumbersome, only two light rays of each light beam are typically indicated. Further, the depiction of the light beams is schematic, and it is to be understood that depicted light beams may be wider or narrower than drawn. Thus, for example, according to some embodiments, first incident LB 105a may impinge over all of first surface 12a, and/or second incident LB 105b may impinge over all of a light receiving surface of LFC 122.

Referring also to FIG. 1B, folded LB 113b travels onto CP 132. A transmitted LB 117b indicates a portion of folded LB 113b, which is transmitted into CP 132 via CP second surface 138b (a portion of folded LB 113b, reflected off CP second surface 138b, and which may be negligible, is not shown). Transmitted LB 117b propagates across CP 132 from CP second surface 138b to CP third surface 138c, next across shape-conforming interface 134 from CP third surface 138c to second surface 12b of sample 10, and, finally, across first part 16a towards internal facet 14.

A reflected LB 121b indicates a portion of transmitted LB 117b reflected by internal facet 14 back towards shape-conforming interface 134 (a portion of transmitted LB 117b, transmitted from first part 16a into second part 16b, if present, is not shown). Reflected LB 121b propagates across first part 16a towards second surface 12b, next across shape-conforming interface 134 from second surface 12b to CP third surface 138c, and, finally, across CP 132 from CP third surface 138c to CP second surface 138b. An emerged LB 125b indicates a portion of reflected LB 121b, which exits CP 132 via CP second surface 138b (a portion of reflected LB 121b, internally reflected by CP second surface 138b, is not shown). Emerged LB 125b travels towards LFC 122 and is folded thereby at the light folding angle α", as indicated by second returned LB 133b. More precisely, emerged LB 125b is redirected by LFC 122 towards ICA 104 (as indicated by second returned LB 133b). Second returned LB 133b is sensed by sensor 114.

Transmitted LB 117b impinges on internal facet 14 at an incidence angle θ. Angles are measured clockwise relative to the point-of-view of a reader perusing the figures. Values of angles greater than 180° are set to negative by subtracting 360°. Thus, as a non-limiting example intended to facilitate the description by making it more concrete, in FIG. 1B, the incidence angle θ is negative and a return angle $θ_R$ (i.e. the reflection angle) is positive. More precisely, the incidence angle θ is shown spanned counter-clockwise from a dotted line B—which indicates a normal to second surface 12b—to a light ray 117b1 (one of the two light rays indicating transmitted LB 117b). The inclination angles α and α' are measured clockwise from first surface 12a (as a non-limiting example, intended to facilitate the description, in FIG. 1A α' is shown as being greater than α).The nominal inclination angle α is spanned clockwise from first surface 12a to the dashed line L. The actual inclination angle α' is spanned clockwise from first surface 12a to internal facet 14.

The incidence angle θ depends on each of the deviations Δα'=α−α' (i.e. the deviation in the inclination of internal facet 14 from the nominal inclination), Δα"=α−α" (i.e. the deviation of the (actual) light folding angle of LFC 122 from α), and Δα'''=α−α''' (i.e. the deviation in the inclination of CP second surface 138b from the nominal inclination). Absent any imperfections in system 100 (i.e. α'''=α"=α), and with CP first surface 138a being oriented in parallel to first surface 12a, the incidence angle θ would equal Δα'. Put differently, the incidence angle θ equals Δα' to a precision dependent on the uncertainties in the light folding angle α" and actual inclination angle α''' and any other relevant uncertainties in parameters of LGA 102, ICA 104, and orienting infrastructure 140 (i.e. the orientation precision thereof). In particular, system 100 is nominally configured to have transmitted LB 117b normally (i.e. perpendicularly) impinge on internal facet 14 when Δα'=0. A normal to internal facet 14 is indicated in FIG. 1B by a (straight) dotted line B.

Typically, due to the manufacturing imperfections of both sample 10 and LGA 102, second returned LB 133b will not be parallel to first returned LB 133a. An angle δ—also referred to as "the angular deviation"—between first returned LB 133a and second returned LB 133b depends on the deviations Δα', Δα", and Δα''', and a refractive index n of the first part 16a (which is equal to the refractive indices of CP 132 and shape-conforming interface 134 or close to the refractive indices thereof). The angle δ is shown spanned clockwise from a light ray 105b1 (one of the two light rays indicating second incident LB 105b) to a light ray 133b1 (one of the two light rays indicating second returned LB 133b) and is therefore positive in FIG. 1A.

The angle δ may be related to Δα' using the laws of geometrical optics and, in particular, Snell's law (and taking into account the actual light folding angle of LFC 122, the actual inclination angle of CP second surface 138b relative to CP first surface 138a, and the refractive index n). Put differently, Δα' depends on Δα", Δα''', the measured value of the angle δ, and the refractive index n.

Figure 1C:
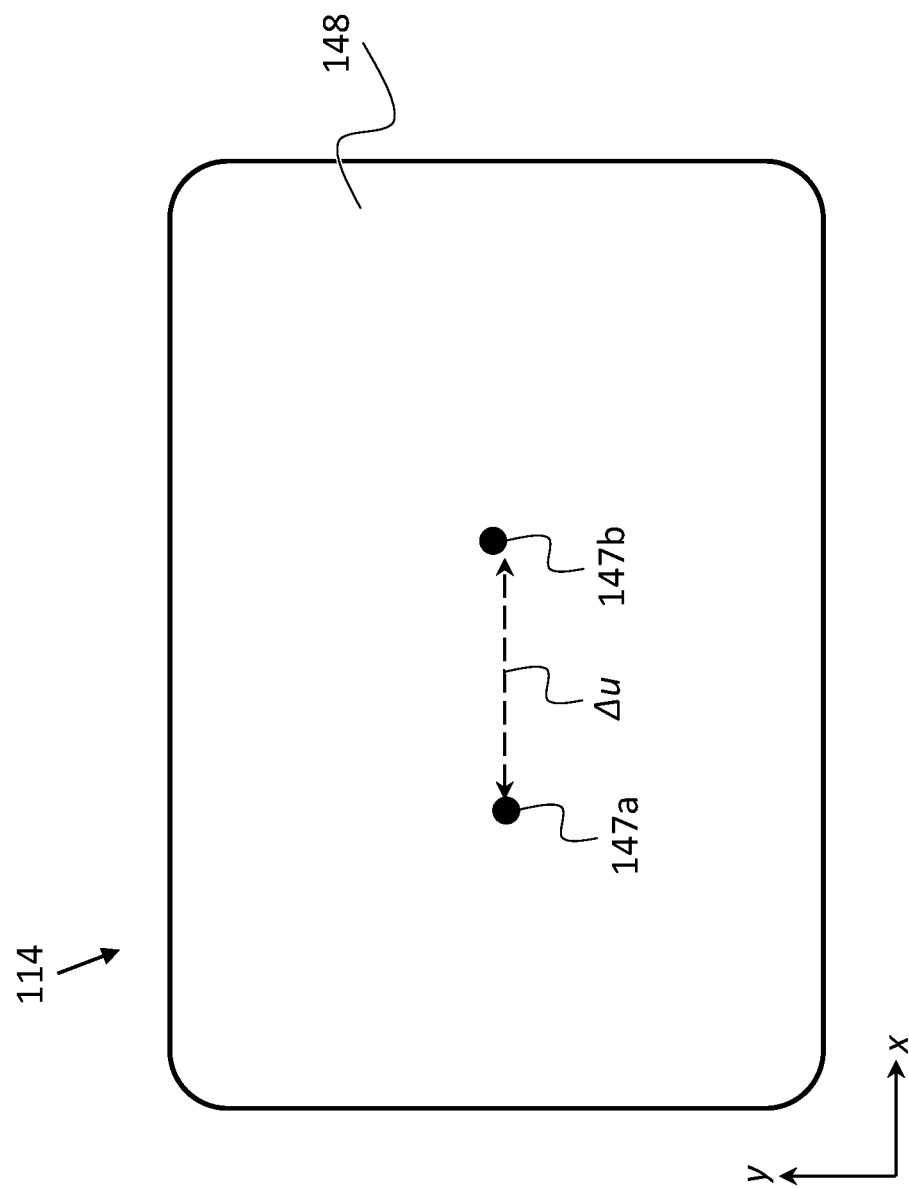
FIG. 1C schematically depicts spots on a photosensitive surface of a sensor of the system of FIG. 1A, according to some embodiments.

Referring also to FIG. 1C, FIG. 1C schematically depicts a first spot 147a and a second spot 147b formed by first returned LB 133a and second returned LB 133b, respectively, on a photosensitive surface 148 of sensor 114, according to some embodiments. $u_1$ and $u_2$ are the horizontal coordinates (i.e. as measured along the x-axis) of first spot 147a and second spot 147b, respectively. (The coordinate system depicted in FIG. 1C is assumed to coincide with the coordinate system depicted in FIG. 1A up to a possible translation of the origin. The x-axis in FIG. 1C thus extends from second incident LB 105b to first incident LB 105a in parallel to first surface 12a.) The angle δ may be directly inferred from the difference $Δu=u_2−u_1$. As a non-limiting example, when the measurement is autocollimator-based (i.e. in embodiments wherein ICA 104 is or includes an autocollimator), δ=Δu/f.

According to some embodiments, controller 108 may be communicatively associated with a computational module 130. Computational module 130 may include a processor(s) and volatile and/or non-volatile memory components. The processor may be configured to receive from controller 108 sensor 114 data (i.e. the values of $u_1$ and $u_2$), and, based thereon, compute Δα'. Optionally, according to some embodiments, the processor may further be configured to compute an uncertainty in the (computed value of) Δα' taking into account manufacturing tolerances and calibration limitations of LGA 102 (including the uncertainty in the actual light folding angle), ICA 104, and orienting infrastructure 140. According to some embodiments, computational module 130 may be included in system 100.

According to some embodiments, light source 112 may be configured to produce a collimated (first) laser beam. According to some such embodiments, optical equipment 118 may include a beam expander (not shown) configured increase the diameter of the laser beam, such that the expanded laser beam may simultaneously impinge on both sample 10 and LFC 122. In such embodiments, first incident LB 105a and second incident LB 105b may constitute complementary portions of the laser beam. Alternatively, optical equipment 118 may include a beam splitter and optics configured to divide the laser beam into a pair of parallel (spaced apart) sub-beams: a first sub-beam and a second sub-beam, which constitute first incident LB 105a and second incident LB 105b, respectively.

According to some such embodiments, optical equipment 118 may be configured to recombine the returned sub-beams (i.e. first returned LB 133a and second returned LB 133b), such that the sub-beams are redirected onto a single light sensor (i.e. sensor 114 according to some embodiments thereof). Ideally, if the second sub-beam (after redirection by LFC 122 and transmission into sample 10) perpendicularly impinges on internal facet 14, then the recombined sub-beams will form a collimated (second) laser beam, and the two spots, formed by the recombined sub-beams on the light sensor, will overlap. According to some other embodiments, two light sensors—such that the distance and the relative orientation therebetween, is known—may be employed. In such embodiments, each of the returned sub-beams may be directed to a different light sensor from the two light sensors.

According to some alternative embodiments, ICA 104 may be configured for interferometry. That is, light source 112, some or all of optical equipment 118, and sensor 114 may constitute components of an interferometric setup, as described below. In such embodiments, light source 112 may be configured to generate a coherent, planar wavefront. Optical equipment 118 may be configured to split the generated wavefront into two wavefronts: a first (coherent, planar) incident wavefront and a second (coherent, planar) incident wavefront, which constitute first incident LB 105a and second incident LB 105b, respectively. In such embodiments, the angle δ may be deduced from an interference pattern formed by first returned LB 133a and second returned LB 133b. More specifically, in such embodiments, first returned LB 133a constitutes a first returned wavefront, obtained from reflection of the first incident wavefront off first surface 12a, and second returned LB 133b constitutes a second returned wavefront, obtained by folding of the second incident wavefront by LFC 122, reflection off internal facet 14, and folding again by LFC 122. The returned wavefronts are recombined and an interference pattern thereof is measured by sensor 114. If the first wavefront and the second wavefront impinge normally on the respective surface (i.e. first surface 12a or internal facet 14, respectively), the recombined wavefront will form a uniform pattern on sensor 114. If second surface 12b deviates from the nominal inclination, then the recombined wavefront will form a periodic pattern on sensor 114. The deviation Δα' may be deduced from the periodicity of the pattern.

According to some embodiments, system 100 may further include two shutters configured to allow selectively blocking each of first returned LB 133a and second returned LB 133b, so that each of returned LBs 133 may be separately sensed (thereby facilitating attributing each of spots 147 to the returned LB that induced the spot).

According to some embodiments, first surface 12a may be coated, or temporarily coated, by a reflective coating, so that light incident thereon is maximally reflected or reflection therefrom is at least increased. According to some embodiments, CP second surface 138b may be coated by an anti-reflective coating, so that external light incident thereon is maximally transmitted into CP 132 and internal light incident thereon is maximally transmitted out of CP 132. According to some embodiments, wherein light source 112 is configured to generate polychromatic light, first surface 12a may be coated by a first coating configured to reflect light in a first spectrum, and CP second surface 138b (or LFC 122 or internal facet 14) may be coated by a second coating configured to reflect light in a second spectrum, which does not, or substantially does not, overlap with the first spectrum. In such embodiments, selective blocking of first returned LB 133a and second returned LB 133b may be implemented using a spectral filter or a spectral filter arrangement (optionally, instead of shutters), positioned such that each of returned LBs 133 is incident thereon and configured to allow selectively blocking or at least partially blocking light in the second spectrum and first spectrum, respectively.

According to some alternative embodiments, a first (passive) spectral filter may be employed to filter first incident LB 105a into the first spectrum, and a second (passive) spectral filter may be employed to filter second incident LB 105b into the second spectrum. In such embodiments, in order to allow separately sensing each of returned LBs 133, an additional spectral filter, positioned between the spectral filters and sensor 114, and configured to allow selectively filtering therethrough light either in the first spectrum or the second spectrum, may be employed.

It is noted that the spectral filter or the spectral filter arrangement may be used to decrease the signal associated with stray light, associated with any one of incident LBs 105, arriving at sensor 114.

While in FIG. 1A, internal facet 14 is shown as sectioning (i.e. dividing in two) sample 10, and, in particular, extending until first surface 12a, it is to be understood that scope of the disclosure is not limited to metrology of so shaped samples: Any sample including an external, flat surface and an internal facet, which is inclined with respect to the external, flat surface, but which does not extend until the external, flat surface, may also undergo internal facet metrology utilizing system 100, as described above.

Figure 2:
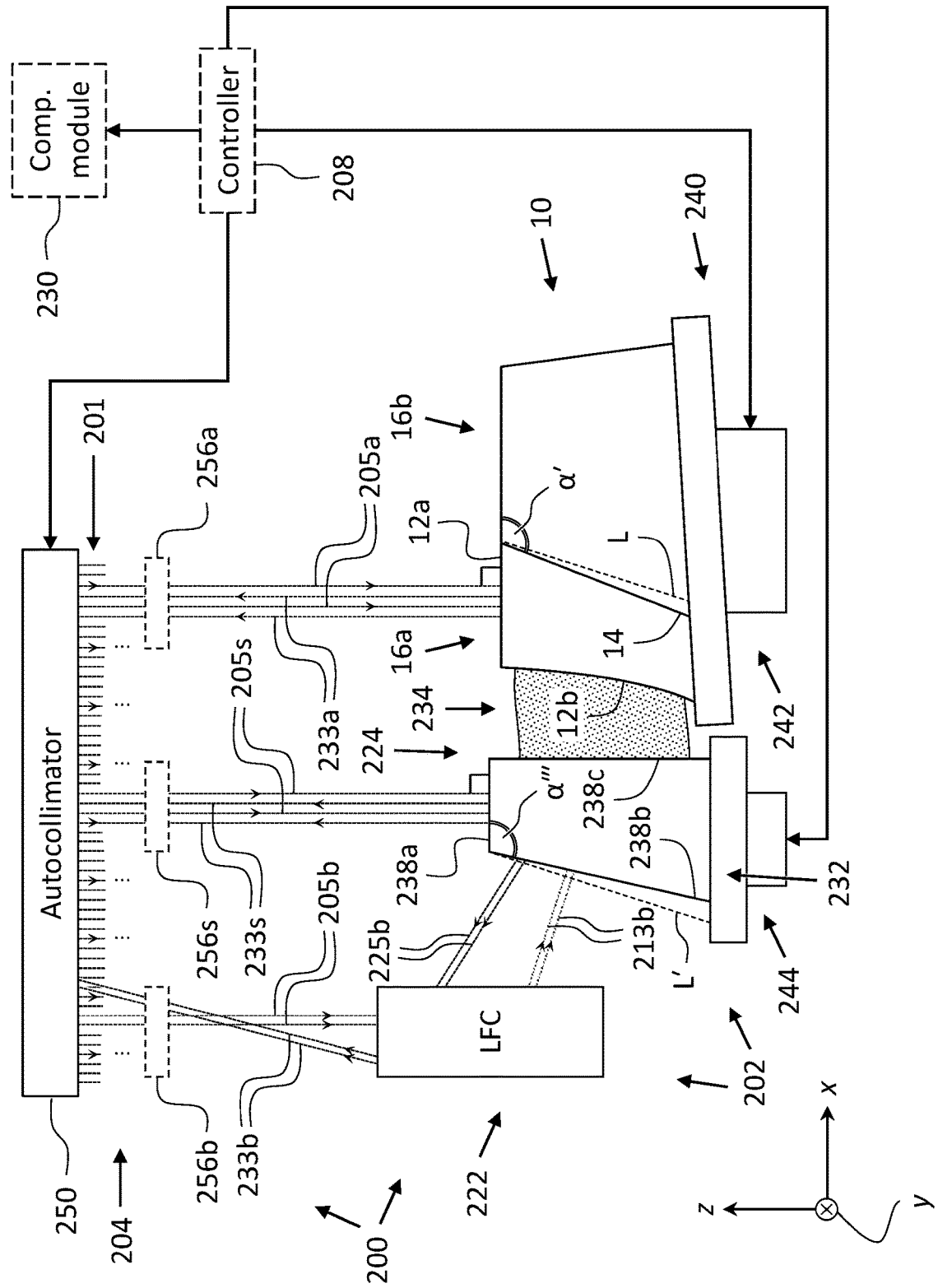
FIG. 2 schematically depicts an optical-based system for internal facet metrology of samples, during inspection of a sample, the system corresponds to specific embodiments of the system of FIG. 1A.

FIG. 2 schematically depicts an optical-based system 200 for validating an angle between an internal facet of a sample and an external, flat surface of the sample, according to some embodiments. System 200 corresponds to specific embodiments of system 100. More specifically, FIG. 2 provides a side-view of system 200 and sample 10 being inspected by system 200, according to some embodiments. System 200 includes a LGA 202, and an ICA 204, which correspond to specific embodiments of LGA 102 and ICA 104. According to some embodiments, and as depicted in FIG. 2, system 200 may further include an orienting infrastructure 240, a controller 208, and, optionally, a computational module 230. Orienting infrastructure 240, controller 208, and computational module 230 correspond to specific embodiments of orienting infrastructure 140, controller 108, and computational module 130, respectively. Orienting infrastructure 240 may include a first stage 242 and a second stage 244, which correspond to specific embodiments of first stage 142 and second stage 144, respectively.

According to some embodiments, ICA 204 includes an autocollimator 250. Autocollimator 250 may be configured to generate a collimated, broad LB 201 in a direction perpendicular to first surface 12a of sample 10. A first incident LB 205a and a second incident LB 205b constitute a first sub-beam and a second sub-beam, respectively, of LB 201. First incident LB 205a and second incident LB 205b correspond to specific embodiments of first incident LB 105a and second incident LB 105b, respectively. Also indicated are a folded LB 213b and an emerged LB 225b, which correspond to specific embodiments of folded LB 113b and emerged LB 125b, respectively.

LGA 202 includes a LFC 222 and a coupling infrastructure 224, which correspond to specific embodiments of LFC 122 and coupling infrastructure 124, respectively. According to some embodiments, and as depicted in FIG. 2, coupling infrastructure 224 includes a CP 232 and a shape-conforming interface 234, which correspond to specific embodiments of CP 132 and shape-conforming interface 134, respectively. CP 232 includes a CP first surface 238a, a CP second surface 238b, and a CP third surface 238c, which correspond to specific embodiments of CP first surface 138a, CP second surface 138b, and CP third surface 138c, respectively, of CP 132.

Additional incident LB 205s may be used to (nominally) orient CP second surface 238b in parallel to internal facet 14. More specifically, additional incident LB 205s may be used to ensure parallelism of a CP first surface 238a of CP 232 and first surface 12a (on which first incident LB 205a normally impinges) of sample 10, since when CP first surface 238a is oriented in parallel to first surface 12a, additional incident LB 205s will normally impinge on CP first surface 238a. Thus, by measuring an angular deviation of an additional returned LB 233s—obtained by the reflection of additional incident LB 205s off CP first surface 238a—relative to first returned LB 233a, the orientation of CP first surface 238a may be adjusted (by rotating second stage 244 and/or first stage 242) until parallelism thereof relative to first surface 12a is attained. With CP first surface 238a being disposed in parallel to first surface 12a, (nominal) parallelism of CP second surface 238b and internal facet 14 may be achieved by rotating CP 232 about an axis parallel to the z-axis.

According to some embodiments, and as depicted in FIG. 2, optical equipment of ICA 204 may include a pair of blocking elements 256a and 256b, allowing to selectively block each of first incident LB 205a and second incident LB 205b or at least facilitate distinguishing between first returned LB 233a and second returned LB 233b. According to some such embodiments, and wherein ICA 204 is further configured to generate additional incident LB 205s, the optical equipment may further include a third blocking element 256s configured to allow selectively blocking additional incident LB 205s or at least facilitate distinguishing additional returned LB 233s from first returned LB 233a and second returned LB 233b.

According to some embodiments, each of blocking elements 256a and 256b, and blocking element 256s (when included) may be a shutter.

According to some embodiments, first surface 12a may be coated, or temporarily coated, by a reflective coating, so that light incident thereon is maximally reflected or reflection therefrom is at least increased. According to some embodiments, CP second surface 238b may be coated by an anti-reflective coating, so that light incident thereon is maximally transmitted into CP 232 or transmission thereto is at least increased. According to some embodiments, CP first surface 238a may be coated by a reflective coating, so that light incident thereon is maximally reflected or reflection therefrom is at least increased.

According to some embodiments (wherein autocollimator 250 is configured to produce polychromatic light), first surface 12a may be coated by a first coating configured to reflect light in a first spectrum, and CP second surface 238b may be coated by a coating configured to transmit into CP 232 light in a second spectrum, which differs from the first spectrum, so as to facilitate distinguishing between first returned LB 233a and second returned LB 233b, and/or internal facet 14 may be configured to reflect light at the second spectrum (and at least partially transmit light in the first spectrum). According to some such embodiments, a spectral filter or spectral filter arrangement (e.g. included in autocollimator 250), configured to allow controllably filtering therethrough light in the first spectrum or the second spectrum, may be employed to facilitate separately sensing each of returned LBs 233.

According to some embodiments, wherein ICA 204 is further configured to generate additional incident LB 205s, CP first surface 238a may be coated by a third coating configured to reflect light in a third spectrum differing from each of the first spectrum and second spectrum, so as to facilitate distinguishing additional returned LB 233s from each of first returned LB 233a and second returned LB 233b. In such embodiments, the spectral filter or spectral filter arrangement (e.g. included in autocollimator 250) may be further configured to allow controllably filtering therethrough light in the third spectrum.

According to some embodiments, blocking elements 256a and 256b may be (passive) spectral filters (a specific example being dichroic filter) configured to filter therethrough light in the first spectrum and the second spectrum, respectively. In such embodiments, in order to allow separately sensing each of returned LBs 233, an additional spectral filter, positioned between blocking elements 256 and autocollimator 250 or included in autocollimator 250, and configured to allow selectively filtering therethrough either light in the first spectrum or the second spectrum, may be employed.

FIG. 3 schematically depicts an optical-based system 300 for validating the angle between an internal facet of a sample and an external, flat surface of the sample, according to some embodiments. System 300 corresponds to specific embodiments of system 100, wherein the LFC is or includes a prism. More specifically, FIG. 3 provides a side-view of system 300 and sample 10 being inspected by system 300. System 300 includes a LGA 302 and an ICA 304 (components thereof are not shown), which correspond to specific embodiments of LGA 102 and ICA 104. According to some embodiments, and as depicted in FIG. 3, system 300 may further include a controller 308, an orienting infrastructure 340, and, optionally, a computational module 330. Orienting infrastructure 340, controller 308, and computational module 330 correspond to specific embodiments of orienting infrastructure 140, controller 108, and computational module 130, respectively.

LGA 302 includes a prism 322 and a coupling infrastructure 324 including a CP 332 and a shape-conforming interface 334. Prism 322 corresponds to specific embodiments of LFC 122. CP 332 and shape-conforming interface 334 correspond to specific embodiments of CP 132 and shape-conforming interface 134. CP 332 includes a CP first surface 338a, a CP second surface 338b, and a CP third surface 338c.

According to some embodiments, prism 322 may be insensitive to variations in pitch—i.e. rotations about the y-axis—at least across a continuous range of pitch angles. According to some such embodiments, and as depicted in FIG. 3, prism 322 may be a pentaprism, or a like-function prism—e.g. a prism including an even number of internally reflecting surfaces. According to some alternative embodiments, not depicted in FIG. 3, instead of prism 322, LGA 302 may include two mirrors, nominally set with respect to one another at the same angle at which the two surfaces of prism 322 (a pentaprism first surface 328a and a pentaprism second surface 328b), which internally reflect a transmitted portion of second incident LB 305b, are set.

Shown in FIG. 3 are a first incident LB 305a, a first returned LB 333a, a second incident LB 305b, a folded LB 313b, a transmitted LB 317b, a reflected LB 321b, an emerged LB 325b, and a second returned LB 333b, which correspond to specific embodiments of first incident LB 105a, first returned LB 133a, second incident LB 105b, folded LB 113b, transmitted LB 117b, reflected LB 121b, emerged LB 125b, and second returned LB 133b, respectively. Also shown in FIG. 3 are the trajectories of second incident LB 305b and emerged LB 325b inside prism 322 after entry thereof thereinto. Penetrating portions of second incident LB 305b after transmission into prism 322, after reflection therein, and after two reflections therein, are numbered 309b1, 309b2, and 309b3, respectively. Penetrating portions of emerged LB 325b after refraction into prism 322, after reflection therein, and after two reflections therein, are numbered 329b1, 329b2, and 329b3, respectively.

FIGS. 4A-4D present examples of internal facet orientation within samples, according to some embodiments. The depicted samples are non-limiting and are intended to illustrate by way of specific examples that system 100 capacity is, in principle, not limited so long as the sample includes: (i) an external (first) surface, which is flat; (ii) an internal facet set at angle relative to the first surface; and (iii) a first part, which is positioned between an external second surface of the sample and the internal facet, which is characterized by a uniform refractive index, and which affords a continuous, straight path for a light beam, transmitted into the sample via the second surface, to normally impinge on the internal facet.

Referring to FIG. 4A, a sample 40 is depicted, according to some embodiments. Sample 40 includes an external, flat first surface 42a, an external second surface 42b, and an internal facet 44. Second surface 42b is positioned opposite to internal facet 44. A first part 46a of sample 40, characterized by a uniform refractive index, is partially bounded by second surface 42b and internal facet 44. Internal facet 44 is nominally inclined at 90° relative to first surface 42a. According to some embodiments, and as depicted in FIG. 4A, second surface 42b may be flat and nominally oriented in parallel to internal facet 44. Sample 40 further includes an external third surface 42c positioned opposite to first surface 42a, and an external fourth surface 42d positioned between first surface 42a and third surface 42c and sharing a common edge with second surface 42b.

Also shown is a CP 432 of a system (of which only CP 432 is shown) for internal facet metrology of samples, which corresponds to specific embodiments of system 100. In particular, CP 432 corresponds to specific embodiments of CP 132. CP 432 includes an external and flat CP first surface 438a, an external and flat CP second surface 438b, and an external CP third surface (not numbered). CP second surface 438b is nominally inclined at the nominal inclination angle relative to CP first surface 438a. CP 432 is oriented such that CP first surface 438a is parallel to first surface 42a and CP second surface 438b is nominally parallel to internal facet 44. A shape-conforming interface (not shown) may be disposed between the CP third surface and second surface 42b.

When sample 40 undergoes inspection, according to the teachings disclosed herein, an incident LB is folded by a LFC such as to nominally normally impinge on CP second surface 438b, as described in the description of system 100.

Figure 5A:
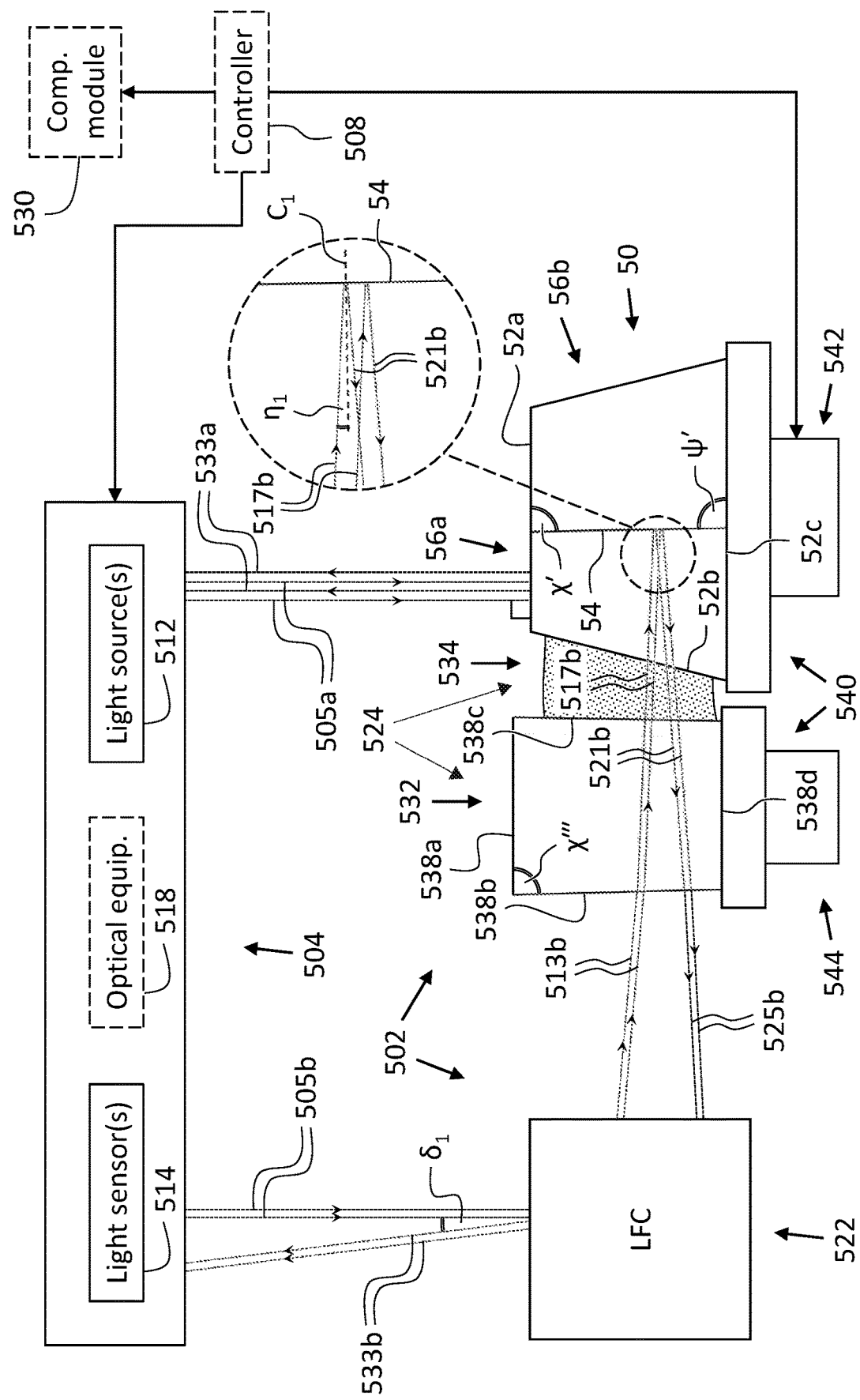
FIGS. 5A and 5B schematically depicts an optical-based system for verifying perpendicularity of an internal facet of a sample with respect to two external, flat surfaces of the sample, which are parallel, during inspection of the sample, the system corresponds to specific embodiments of the system of FIG. 1A.
Figure 5B:
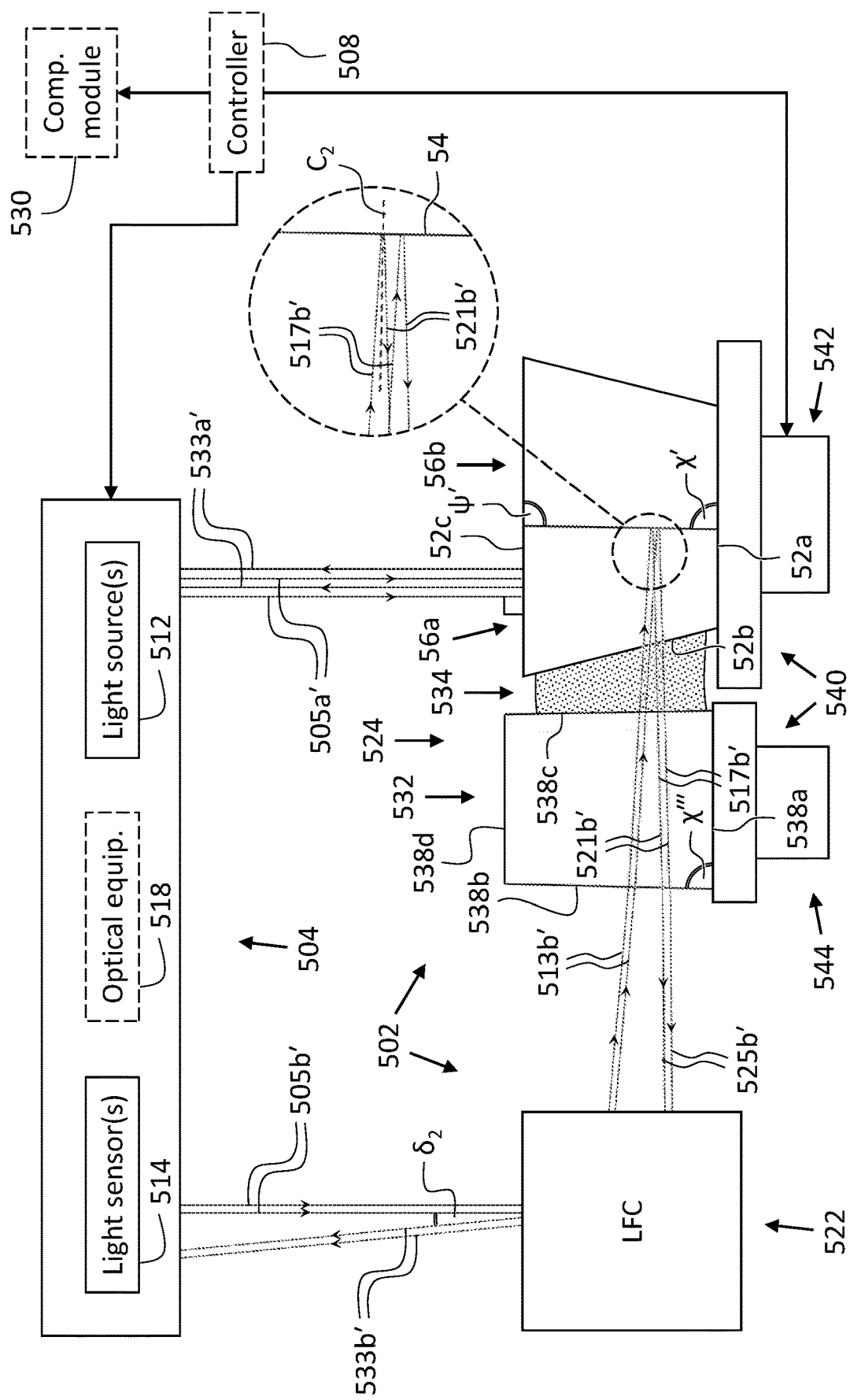

According to some embodiments, wherein, as depicted in FIG. 4A, third surface 42c is flat and parallel to first surface 42a with an uncertainty in the parallelism of third surface 42c and first surface 42a being smaller than a required measurement accuracy of the inclination angle, the system depicted in FIGS. 5A and 5B may be utilized to measure the (actual) inclination angle.

Referring to FIG. 4B, a sample 40' is depicted, according to some embodiments. Sample 40' includes an external, flat first surface 42a', an external second surface 42b', and an internal facet 44'. A first part 46a' of sample 40', characterized by a uniform refractive index, is partially bounded by second surface 42b' and internal facet 44'. Sample 40' has the same exterior geometry as sample 40 but differs therefrom in an inclination angle (relative to first surface 42a') of internal facet 44', which is obtuse. More specifically, the inclination of internal facet 44' differs from that of internal facet 44 by rotation about an axis parallel to the y-axis.

Also shown is a CP 432' of a system (of which only CP 432' is shown') for internal facet metrology of samples, which corresponds to specific embodiments of system 100. In particular, CP 432' corresponds to specific embodiments of CP 132. CP 432' includes an external and flat CP first surface 438a', an external and flat CP second surface 438b', and an external CP third surface (not numbered). CP second surface 438b' is nominally inclined at the nominal inclination angle relative to CP first surface 438a'. CP 432' is oriented such that CP first surface 438a' is parallel to first surface 42a' and CP second surface 438b' is nominally parallel to internal facet 44'. A shape-conforming interface (not shown) may be disposed between the CP third surface and second surface 42b'.

When sample 40' undergoes inspection, according to the teachings disclosed herein, an incident LB is folded by a LFC such as to nominally normally impinge on CP second surface 438b', as described in the description of system 100.

Referring to FIG. 4C, a sample 40" is depicted, according to some embodiments. Sample 40" includes an external, flat first surface 42a", an external second surface 42b", an external third surface 42c", an external fourth surface 42d", and an internal facet 44" nominally inclined at 90° relative to first surface 42a. A first part 46a" of sample 40", characterized by a uniform refractive index, is partially bounded by second surface 42b" and internal facet 44". Third surface 42c" is positioned opposite to first surface 42a". Fourth surface 42d" extends between first surface 42a and second surface 42b and shares a common edge with second surface 42b". According to some embodiments, and as depicted in FIG. 4C, fourth surface 42d" is flat. Sample 40" has the same exterior geometry as sample 40 but differs therefrom in the orientation of internal facet 44". More specifically, the orientation of internal facet 44" differs from that of internal facet 44 by rotation about an axis parallel to the z-axis.

Also shown is a CP 432" of a system (of which only CP 432" is shown) for internal facet metrology of samples, which corresponds to specific embodiments of system 100. In particular, CP 432" corresponds to specific embodiments of CP 132. CP 432" includes an external and flat CP first surface 438a", an external and flat CP second surface 438b", and an external CP third surface (not numbered). CP second surface 438b" is nominally inclined at the nominal inclination angle relative to CP first surface 438a". CP 432" is oriented such that CP first surface 438a" is parallel to first surface 42a" and CP second surface 438b" is nominally parallel to internal facet 44". A shape-conforming interface (not shown) may be disposed between the CP third surface and second surface 42b".

When sample 40" undergoes inspection, according to the teachings disclosed herein, an incident LB is folded by a LFC such as to nominally normally impinge on CP second surface 438b", as described in the description of system 100.

According to some embodiments, wherein, as depicted in FIG. 4C, third surface 42c" is flat and parallel to first surface 42a with an uncertainty in the parallelism of third surface 42c" and first surface 42a" being smaller than a required measurement accuracy of the inclination angle, the system depicted in FIGS. 5A and 5B may be utilized to measure the (actual) inclination angle.

Referring to FIG. 4D, a sample 40''' is depicted, according to some embodiments. Sample 40''' includes an external, flat first surface 42a''', an external second surface 42b''', and an internal facet 44'. A first part 46a''' of sample 40''', characterized by a uniform refractive index, is partially bounded by second surface 42b''' and internal facet 44'. Sample 40''' has the same exterior geometry as sample 40 but differs therefrom in an inclination angle γ (relative to first surface 42a''') of internal facet 44''', which is obtuse, as well as in an orientation relative to second surface 42b". More specifically, the inclination of internal facet 44''' differs from that of internal facet 44 by rotation about a first axis parallel to an axis s (indicated in FIG. 4C), which is positioned on the yz-plane about midway between positive y-axis and the positive z-axis.

A top edge 48a''' of internal facet 44''' extends along first surface 42a'''. Also indicated are: (i) a straight, dashed first line $T_1$, which extends along internal facet 44''' and is perpendicular to top edge 48a''', (ii) a second straight, dashed second line $T_2$, which is perpendicular to first surface 42a''' and intersects first line $T_1$ at top edge 48a''', and (iii) a straight, dashed third line $T_3$, which extends from first line $T_1$ to second line $T_2$ in parallel to first surface 42a''' (and is therefore perpendicular to second line $T_2$). Finally, the inclination angle γ is indicated.

Also shown is a CP 432''' of a system (of which only CP 432''' is shown) for internal facet metrology of samples, which corresponds to specific embodiments of system 100. In particular, CP 432''' corresponds to specific embodiments of CP 132. CP 432''' includes an external and flat CP first surface 438a''', an external and flat CP second surface 438b''', and an external CP third surface (not numbered). CP second surface 438b''' is nominally inclined at the nominal inclination angle relative to CP first surface 438a'''. CP 432''' is oriented such that CP first surface 438a''' is parallel to first surface 42a''' and CP second surface 438b''' is nominally parallel to internal facet 44'''. A shape-conforming interface (not shown) may be disposed between the CP third surface and second surface 42b'''.

When sample 40''' undergoes inspection, according to the teachings disclosed herein, an incident LB is folded by a LFC such as to nominally normally impinge on CP second surface 438b''', as described in the description of system 100.

FIGS. 5A and 5B schematically depict an optical-based system 500 for validating perpendicularity of an internal facet of a sample relative to at least two other external and flat surfaces of the sample, which are parallel to one another, according to some embodiments. System 500 corresponds to specific embodiments of system 100. More specifically, each of FIGS. 5A and 5B presents a respective cross-sectional side-view of system 500 and a sample 50 being inspected by system 500, according to some embodiments.

Sample 50 includes an external and flat first surface 52a, an external second surface 52b, an external and flat third surface 52c, and an internal facet 54. Similarly to internal facet 14 (which constitutes the boundary between, or forms a thin flat layer disposed between, first part 16a and second part 16b of sample 10), internal facet 54 constitutes the boundary between, or forms a thin flat layer disposed between, a first part 56a and a second part 56b of sample 50. First surface 52a and third surface 52c are parallel by design. Further, sample 50 is manufactured to exhibit a (nominal) inclination angle of 90° of internal facet 54 relative to first surface 52a (and third surface 52c). However, due to fabrication imperfections an actual inclination angle of internal facet 52b relative to first surface 52a, labelled in FIGS. 5A and 5B as ϰ', will generally differ from 90°.

It is noted that using state-of-the-art manufacturing techniques, (manufacturing) tolerances for the actual angle between external, flat surfaces, which are fabricated to be parallel, are significantly smaller than tolerances for the actual angle between an internal facet and an external, flat surface. Hence, since first surface 52a and third surface 52c are manufactured to be parallel, the deviation from the parallelism thereof is expected to be negligible as compared to the deviation of the actual inclination angle ϰ' from 90°. Accordingly, an actual angle ψ' (also referred to as "the actual supplementary angle") between internal facet 54 and first surface 52a may be taken to equal 180°−ϰ', i.e. the supplementary angle to the actual inclination angle ϰ'. (The nominal value of the actual supplementary angle ψ' is 90°.)

System 500 includes a LGA 502 and an ICA 504. LGA 502 corresponds to specific embodiments of LGA 102 and includes a LFC 522 and a coupling infrastructure 524, which correspond to specific embodiments of LFC 122 and coupling infrastructure 124, respectively. LFC 522 is nominally configured to fold by 90° light incident thereon in a direction perpendicular to the nominal inclination of internal facet 54. According to some embodiments, LFC 522 may be a prism, one or more mirrors, or a diffraction grating. According to some embodiments, LFC 522 may be a pentaprism or a like-function prism (i.e. insensitive to variations in pitch) configured to fold light incident thereon by 90°. According to some embodiments, LFC 522 may be a pair of mirrors set at an angle, or a like-function arrangement of mirrors (i.e. insensitive to variations in pitch), configured to fold light incident thereon by 90°.

According to some embodiments, and as depicted in FIGS. 5A and 5B, coupling infrastructure 524 may include a CP 532 and a shape-conforming interface 534, which correspond to specific embodiments of CP 132 and shape-conforming interface 134, respectively. CP 532 includes a CP first surface 538a, a CP second surface 538b, a CP third surface 538c, which correspond to specific embodiments of CP first surface 138a, CP second surface 138b, and CP third surface 138c, respectively. CP second surface 538b is nominally perpendicular to CP first surface 538a. CP 532 further includes a CP fourth surface 538d, which is positioned opposite to CP first surface 538a. According to some embodiments, and as depicted in FIGS. 5A and 5B, CP fourth surface 538d may be parallel to CP first surface 538a.

According to some embodiments, system 500 may further include orienting infrastructure 540, which corresponds to specific embodiments of orienting infrastructure 140. Orienting infrastructure 540 includes an orientable first stage 542 and an orientable second stage 544, which are configured for placement thereon, and orienting of, sample 50 and CP 532, respectively, essentially as described with respect to first stage 142 and second stage 144 in the description of system 100.

According to some embodiments, and as depicted in FIGS. 5A and 5B, system 500 may further include a controller 508, and, optionally, a computational module 530, which correspond to specific embodiments of controller 108 and computational module 130, respectively.

ICA 504 corresponds to specific embodiments of ICA 104 and includes a light source 512, a sensor 514, and, optionally, optical equipment 518, which correspond to specific embodiments of light source 112, sensor 114, and optical equipment 118, respectively. According to some embodiments, light source 512, sensor 514, and some or all of optical equipment 518 may constitute components of an autocollimator, which may be similar to autocollimator 250. According to some embodiments, optical equipment 518 may include blocking elements (not shown), which may be similar to blocking elements 256.

ICA 504 is configured to output a first incident LB 505a directed at sample 50 and second incident LB 505b is directed at LFC 522. ICA 204 and sample 50 are positioned and oriented, such that first incident LB 505a is incident on first surface 52a perpendicularly thereto. In operation, first incident LB 505a (or at least a portion thereof) is reflected off first surface 52a—as indicated by a first returned LB 533a. First returned LB 533a is sensed by sensor 514.

LFC 522 is configured to nominally fold second incident LB 505b by 90°. More precisely, LFC 522 is configured and oriented to fold second incident LB 505b, such that a (first) folded LB 513b (obtained by the folding of second incident LB 505b) is nominally directed at 90° relative to second incident LB 505b and (nominally) perpendicularly to CP second surface 538b. In practice, due to manufacturing imperfections (and alignment imprecision in embodiments wherein LFC 522 is sensitive to variations in pitch), an actual light folding angle ϰ" of LFC 522 may slightly deviate from 90°. As elaborated on below, by flipping sample 50, so as to invert first surface 52a and third surface 52c, and flipping CP 532, so as to invert CP first surface 538a and CP fourth surface 538d, and then repeating the measurement described in the next two paragraphs, the effect of manufacturing imperfections of LFC 522 may be cancelled out or substantially cancelled out.

In operation, folded LB 513b, or at least a part thereof, is transmitted into CP 532 via CP second surface 538b, as indicated by a (first) transmitted LB 517b. Transmitted LB 517 propagates across CP 532, across shape-conforming interface 534, and first part 56a, and impinges on internal facet 54 at a (first) incidence angle $\eta_1$, essentially as described above with respect to transmitted LB 117b in the description of FIG. 1B. The incidence angle $\eta_1$ depends on each of the deviations $\Delta\varkappa'=90°-\varkappa'$ (i.e. the deviation from 90° in the inclination of internal facet 54 relative to first surface 52a), $\Delta\varkappa''=90°-\varkappa''$ (i.e. the deviation of the (actual) light folding angle of LFC 522 from 90°), and $\Delta\varkappa'''=90°-\varkappa'''$ (i.e. the deviation from 90° in the inclination of CP second surface 538b relative to CP first surface 538a). In particular, system 500 is nominally configured to have transmitted LB 517b normally impinge on internal facet 54 when $\Delta\varkappa'=0$. A normal to internal facet 54 is indicated in FIG. 5A by a (straight) dashed line $C_1$.

A transmitted LB 517b (or at least a portion thereof) is specularly reflected off internal facet 54 (i.e. at a return angle equal to minus the first incidence angle $\eta_1$), as indicated by a (first) reflected LB 521b. Reflected LB 521b travels back towards LFC 522 via first part 56a, shape-conforming interface 534, and CP 532. A (first) emerged LB 525b indicates a (first) portion of reflected LB 521b, which is refracted to the outside CP 532 via CP second surface 538b (unless exactly perpendicularly incident on CP second surface 538, in which case the first portion will maintain the propagation direction thereof; a second portion of reflected LB 521b, specularly reflected by CP second surface 538b inside CP 532, is not shown). Emerged LB 525b is folded by LFC 522 at the light folding angle ϰ", as indicated by a second returned LB 533b. Second returned LB 533b is sensed by sensor 514.

Figure 5C:
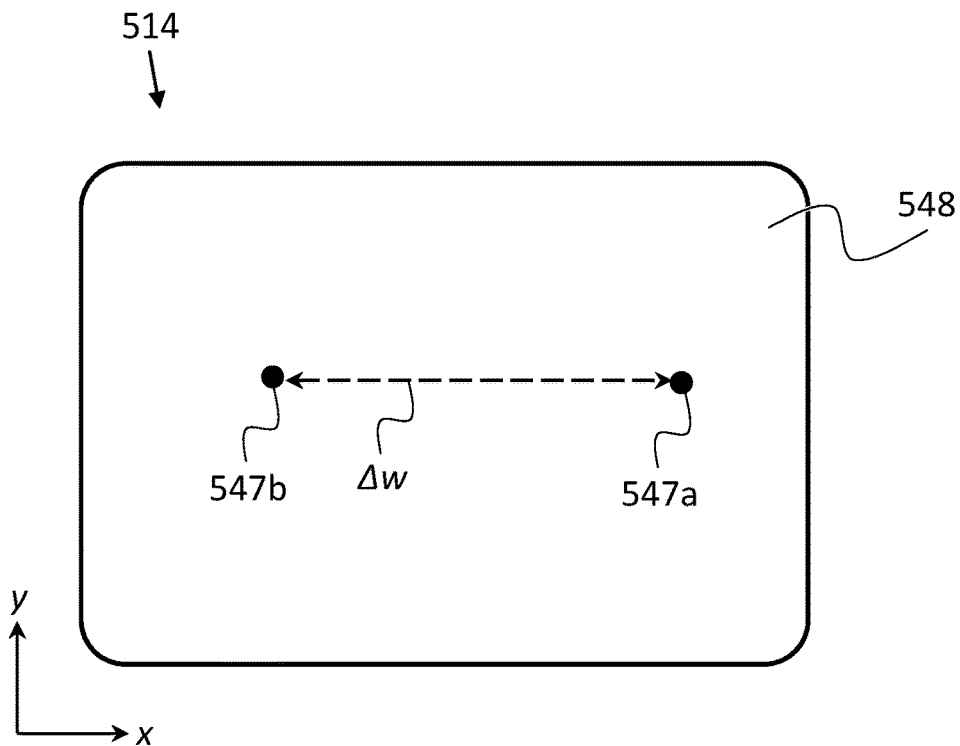
FIGS. 5C and 5D schematically depict spots on a photosensitive surface of a sensor of the system of FIGS. 5A and 5B, according to some embodiments.

An angle $\delta_1$ between second returned LB 533b and first returned LB 533a—also referred to as "the first angular deviation"—depends on the deviations $\Delta\varkappa'$, $\Delta\varkappa''$, and $\Delta\varkappa'''$, and a refractive index n' of first part 56a (which is equal to, or close to, the refractive indices of CP 532 and shape-conforming interface 534). FIG. 5C schematically depicts a first spot 547a and a second spot 547b formed by first returned LB 533a and second returned LB 533b, respectively, on a photosensitive surface 548 of sensor 514, according to some embodiments. $w_1$ and $w_2$ are the horizontal coordinates (i.e. as measured along the x-axis) of first spot 547a and second spot 547b, respectively. The angle $\delta_1$ may be directly inferred from the difference $\Delta w = w_2 - w_1$.

Referring to FIG. 5B, as compared to FIG. 5A, sample 50 has been flipped, such that first surface 52a and third surface 52c are inverted (while maintaining the nominal orientation of internal facet 54 relative to LGA 502) and CP 532 has been flipped, such that CP first surface 538a and CP fourth surface 538d are inverted (while maintaining a nominal orientation of CP second surface 538b relative to sample 50).

In operation, third incident LB 505a' is directed at sample 50, perpendicularly thereto, and fourth incident LB 505b' is directed at LFC 522. Third incident LB 505a' (or at least a portion thereof) is reflected off third surface 52c—as indicated by a third returned LB 533a'. Third returned LB 533a' is sensed by sensor 514.

Fourth incident LB 505b' impinges on LFC 522, resulting in a second folded LB 513b', which in turn impinges on CP second surface 538b, resulting in a second transmitted LB 517b', which propagates across CP 532, across shape-conforming interface 534, and into first part 56a of sample 50. Second transmitted LB 517b' impinges on internal facet 54 at a second incidence angle 112. The second incidence angle $\eta_2$ depends on each of the deviations $\Delta\psi'=90°-\psi'$ (i.e. the deviation from 90° in the inclination of internal facet 54 relative to third surface 52c), $\Delta\varkappa''=90°-\varkappa''$, and $\Delta\varkappa'''=90°-\varkappa'''$ (implicitly assuming that the uncertainty in the parallelism of the CP first surface 538a and CP fourth surface 538d is smaller than a required measurement precision of the actual inclination angle ϰ'). A normal to internal facet 54 is indicated in FIG. 5B by a (straight) dashed line $C_2$.

Second transmitted LB 517b' is (at least in part) specularly reflected off internal facet 54 (i.e. at a return angle $\zeta_2$ equal to minus the second incidence angle $\eta_2$), as indicated by a second reflected LB 521b'. Second reflected LB 521b' travels back towards LFC 522 via first part 56a, shape-conforming interface 534, and CP 532. A second emerged LB 525b' indicates a portion of second reflected LB 521b', which exits CP 532 via CP second surface 538b (a portion of second reflected LB 521b', internally reflected by CP second surface 538b, is not shown). Second emerged LB 525b' is folded by LFC 522 at the light folding angle ϰ", as indicated by a fourth returned LB 533b'. Fourth returned LB 533b' is sensed by sensor 514.

Figure 5D:
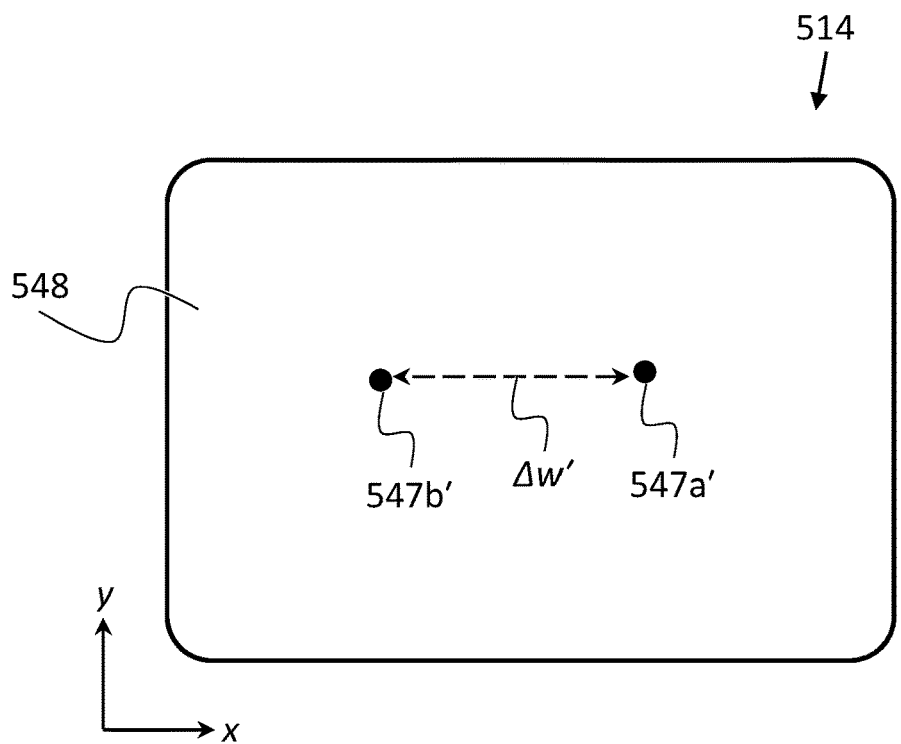

An angle $\delta_2$ between fourth returned LB 533b' and third returned LB 533a'—also referred to as "the second angular deviation"—depends on the deviations $\Delta\varkappa'$, $\Delta\varkappa''$, and $\Delta\varkappa'''$, and the refractive index n'. More specifically, angle $\delta_2$ exhibits the same dependence on $\Delta\varkappa'=180°-\Delta\varkappa'$, $\Delta\varkappa''$, and $\Delta\psi'''=180°-\Delta\varkappa'''$, and the refractive index n', as exhibited by the angle $\delta_1$ on the deviations $\Delta\varkappa'$, $\Delta\varkappa''$, and $\Delta\varkappa'''$, and the refractive index n', respectively. FIG. 5D schematically depicts a third spot 547a' and a fourth spot 547b' formed by third returned LB 533a' and fourth returned LB 533b', respectively, on photosensitive surface 548, according to some embodiments. $w_1'$ and $w_2'$ are the horizontal coordinates of third spot 547a' and fourth spot 547b', respectively. The angle $\delta_2$ may be directly inferred from the difference $\Delta w' = w_2' - w_1'$.

While in FIGS. 5C and 5D Δw and Δw' are both shown as being negative (so that $\delta_1$ and $\delta_2$ are both negative), it is to be understood that generally Δw and Δw' may have opposite signs (so that $\delta_1$ and $\delta_2$ will have opposite signs), or may both be positive (so that $\delta_1$ and $\delta_2$ are both positive).

Each of the measured angles $\delta_1$ and $\delta_2$ may be used to provide a respective estimate of the deviation angle $\Delta\varkappa'$. Absent any imperfections in system 500, $\eta_2$ would equal $-\eta_1$ and $\delta_1$ would equal $-\delta_2$. However, in practice, the two estimates will generally differ due to the actual light folding angle deviating from 90° and the actual inclination angle of CP second surface 538b deviating from 90°. Since $\delta_1$ and $\delta_2$ have the same (when the LFC is insensitive to variations in pitch), or substantially the same, dependence on the deviation $\Delta\varkappa''$ (i.e. both $\delta_1$ and $\delta_2$ increase as ϰ" is increased and decrease as ϰ" is decreased), the deviation from 90° of the (actual) light folding angle may be cancelled out, or substantially cancelled out, by averaging over the two estimates of the deviation angle $\Delta\varkappa'$. Denoting by $<\varkappa'>$ the so-averaged estimate of the actual inclination of internal facet 54, and by $<\Delta\varkappa'>$ the averaged estimate of the deviation of the actual inclination angle from 90° (i.e. $<\varkappa'>=90°-<'\varkappa'>$), $<\varkappa'>$ can be shown to equal $90°+(\delta_1-\delta_2)/(4n')+\Delta\varkappa'''\cdot(n'-1)/n'$. More generally, $<\varkappa'>$ may be between $90°+0.95\cdot[(\delta_1-\delta_2)/(4n)+\Delta\varkappa'''\cdot(n-1)/n)]$ and $90°+1.05\cdot[(\delta_1-\delta_2)/(4n)+\Delta\varkappa'''\cdot(n-1)/n)]$, between $90°+0.9\cdot[(\delta_1-\delta_2)/(4n)+\Delta\varkappa'''\cdot(n-1)/n)]$ and $90°+1.1\cdot[(\delta_1-\delta_2)/(4n)+\Delta\varkappa'''\cdot(n-1)/n)]$, or even between $90°+0.8\cdot[(\delta_1-\delta_2)/(4n)+\Delta\varkappa'''\cdot(n-1)/n)]$ and $90°+1.2\cdot[(\delta_1-\delta_2)/(4n)+\Delta\varkappa'''\cdot(n-1)/n)]$. Each possibility corresponds to separate embodiments. In particular, in embodiments wherein ICA 504 is or includes an autocollimator, $<\varkappa'>$ can be shown to equal, or to equal about, $90°+(\Delta w-\Delta w')/(2\cdot f_0\cdot n')+\Delta\varkappa'''(n'-1)/n'$, wherein $f_0$ is the focal length of the collimating lens of the autocollimator.

According to some alternative embodiments, not depicted in FIGS. 5A and 5B, light source 512 and optical equipment 518 may be configured to produce an expanded (collimated) laser beam or a pair of parallel and spaced-apart (collimated) laser beams, essentially as described above in the description of system 100. According to still other embodiments, ICA 504 may be or includes an interferometric setup, as described above in the description of system 100.

While in each of FIGS. 1A, 1B, 2, 3, 5A, and 5B the samples are shown as including a single internal facet (e.g. internal facet 14 in sample 10 and internal facet 54 in sample 50), the disclosed systems may also be utilized to obtain information about a plurality of internal facets, which are nominally parallel. According to some embodiments, the information may be collective information and may specify the average (mean) actual inclination angle of the internal facets, or a weighted average of the actual inclination angles, as described below.

Figure 6A:
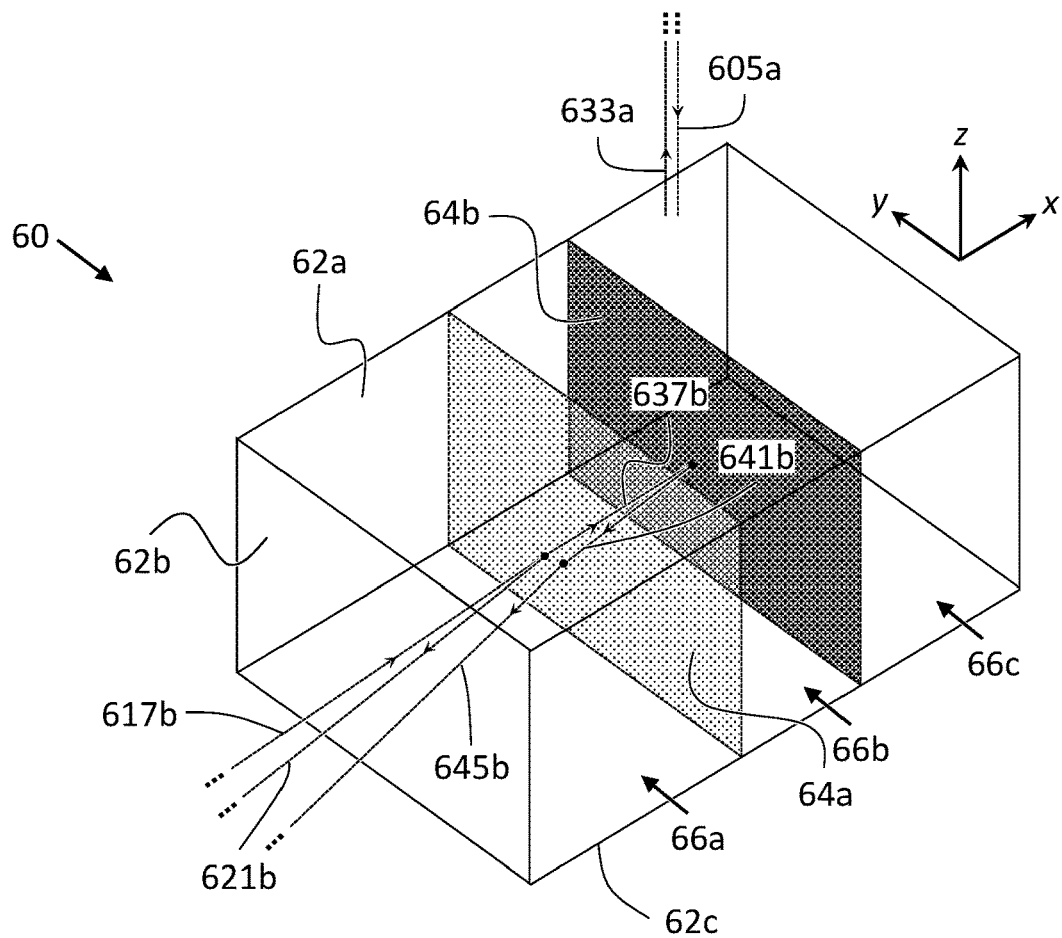
FIG. 6A schematically depicts inspection of a sample including a pair of internal facets, which are nominally parallel, the inspection is performed utilizing a system corresponding to specific embodiments of the system of FIG. 1A.

Referring to FIG. 6A, FIG. 6A depicts such a sample, a sample 60, according to some embodiments. To facilitate the description, by rendering it more concrete, sample 60 is shown as including two nominally parallel internal facets, but the skilled person will readily appreciate that it is straightforward to apply the teachings of FIGS. 6A and 6B to samples including three or more internal facets, which are nominally parallel. Sample 60 includes an external, flat first surface 62a, an external second surface 62b, a first internal facet 64a, and a second internal facet 64b. Second surface 62b is set at an angle relative to first surface 62a (and may or may not be flat). First internal facet 64a is flat and nominally inclined at a nominal inclination angle (not indicated) relative to first surface 62a. Second internal facet 64b is flat and nominally parallel to first internal facet 64a. First internal facet 64a is positioned between second surface 62b and second internal facet 64b. A first part 66a of sample 60 is partially bounded by second surface 62b and first internal facet 64a. A second part 66b of sample 60 is partially bounded by first internal facet 64a and second internal facet 64b. Second internal facet 64b extends between second part 66b and a third part 66c of sample 60. First part 66a and second part 66b have the same refractive index (or close refractive indices). First internal facet 64a constitutes a thin layer of material(s) characterized by a refractive index, which differs from that of first part 66a and second part 66b.

Information regarding the actual inclination angles of first internal facet 64a and second internal facet 64b relative to first surface 62a may be obtained utilizing any one of systems 100, 200, or 300, essentially as described above in the corresponding descriptions and with additions/adjustments as specified below. In embodiments wherein the nominal inclination angle is 90° and sample 60 includes an external, flat third surface 62c, which is parallel to first surface 62a, information regarding the actual inclination angles may be obtained utilizing system 500, essentially as described above in the corresponding descriptions and with additions/adjustments as specified below.

To facilitate the description and render the discussion more concrete, it is assumed that a system (not shown in FIG. 6A), which corresponds to specific embodiments of system 100, is utilized to inspect sample 60. Indicated is a first incident LB 605a (only a single ray thereof is shown), which is projected on first surface 62a, perpendicularly thereto. A first returned LB 633a is obtained from the reflection of first incident LB 605a off first surface 62a. Also indicated is a transmitted LB 617b (only a single ray thereof is shown), which may be obtained by nominally folding (using a LFC of the system (not shown) employed to perform the inspection) a second incident LB at the nominal inclination angle, which is then transmitted into a CP of the system, oriented such that the folded LB is nominally perpendicularly incident on an external, flat surface of the CP, which is nominally parallel to internal facets 64. Transmitted LB 617b exits the CP into a shape-conforming interface positioned between the CP and sample 60. Each of the CP and the shape-conforming interface are characterized by a refractive index equal to, or at least close to, that of first part 66a and second part 66b of sample 60. Transmitted LB 617b enters sample 60 via second surface 62b. Transmitted LB 617b nominally perpendicularly impinges on first internal facet 64a. A reflected LB 621b corresponds to the portion of transmitted LB 617b, which is specularly reflected off first internal facet 64a. A (first) transmitted portion 637b corresponds to the portion of transmitted LB 617b, which is transmitted into second part 66b. Transmitted portion 637b nominally perpendicularly impinges on second internal facet 64b. A reflected portion 641b corresponds to the portion of transmitted portion 637b, which is specularly reflected off second facet 64b. A second transmitted portion 645b indicates the portion of reflected portion 641b, which is transmitted back into first part 66a via first internal facet 64a.

Figure 6B:
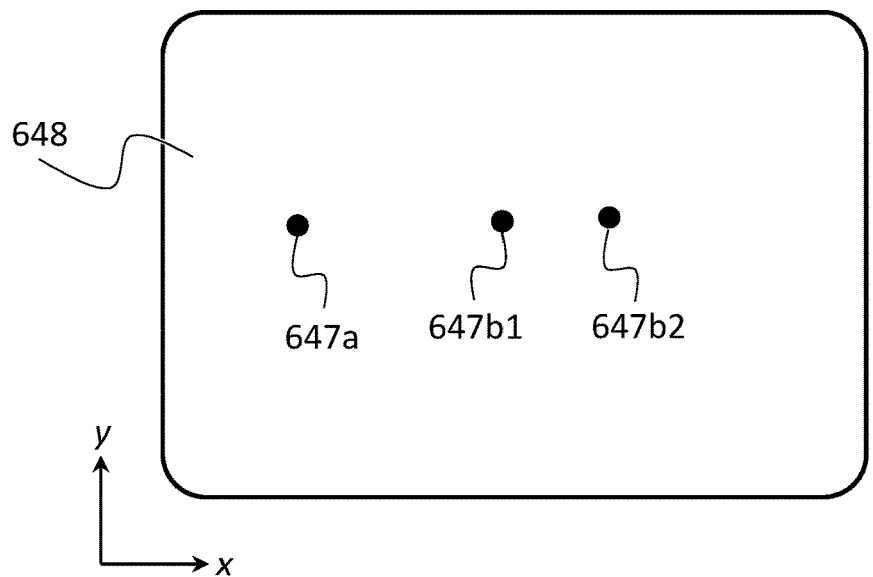
FIG. 6B schematically depict spots on a photosensitive surface of a sensor of the system utilized to inspect the sample of FIG. 6A, according to some embodiments.

FIG. 6B schematically depicts a first spot 647a and a pair of spots 647b—including a second spot 647b1 and a third spot 647b2—on a photosensitive surface 648 of a sensor 614 of the system employed to inspect sample 60, according to some embodiments. First spot 647a is formed by first returned LB 633a. Second spot 647b1 and a third spot 647b2 are formed by the returned LBs induced by reflected LB 621b and second transmitted portion 645b (i.e. by reflection off first internal facet 64a and second internal facet 64b, respectively). Utilizing blocking elements and blocking/filtering techniques, first returned LB 633a may be discriminated from the returned LBs (not shown) induced by reflected LB 621b and second transmitted portion 645b. If second spot 647b1 (and third spot 647b2) cannot be attributed to one of the two returned LBs, induced by reflected LB 621b and second transmitted portion 645b, then only collective information (e.g. average actual inclination) about first internal facet 64a and second internal facet 64b may be extracted from the positions of second spot 647b1 and third spot 647b2 (from the average of the deviation angles of the returned LBs, associated with reflected LB 621b and second transmitted portion 645b, relative to first returned LB 633a).

According to some embodiments, the intensity of the returned LB, associated with reflected LB 621b, may be significantly greater than the intensity of the returned LB, associated with second transmitted portion 645b. Accordingly, first spot 647b1 may be attributed to reflected LB 621b or second transmitted portion 645b according to whether the brightness thereof is respectively greater or lesser than that of second spot 647*b*2 (with the inverse applying for second spot 647*b*2).

According to some embodiments, first internal facet 64*a* is configured to reflect light at a first spectrum and second internal facet 64*b* is configured to reflect light at a second spectrum. The second spectrum sufficiently differs from the first spectrum so as to allow discriminating between the returned LB induced by reflection off first internal facet 64*a*, and the returned LB induced by the reflection off second internal facet 64*b*. The discrimination may be carried out utilizing a spectral filter, which is configured to selectively filter therethrough light in either of the first and second spectra, as described above in the description of FIGS. 1A and 2. Discrimination between first returned LB 633*a* and the returned LBs, induced by reflection off internal facets 64, may be similarly carried out.

Figure 8B:
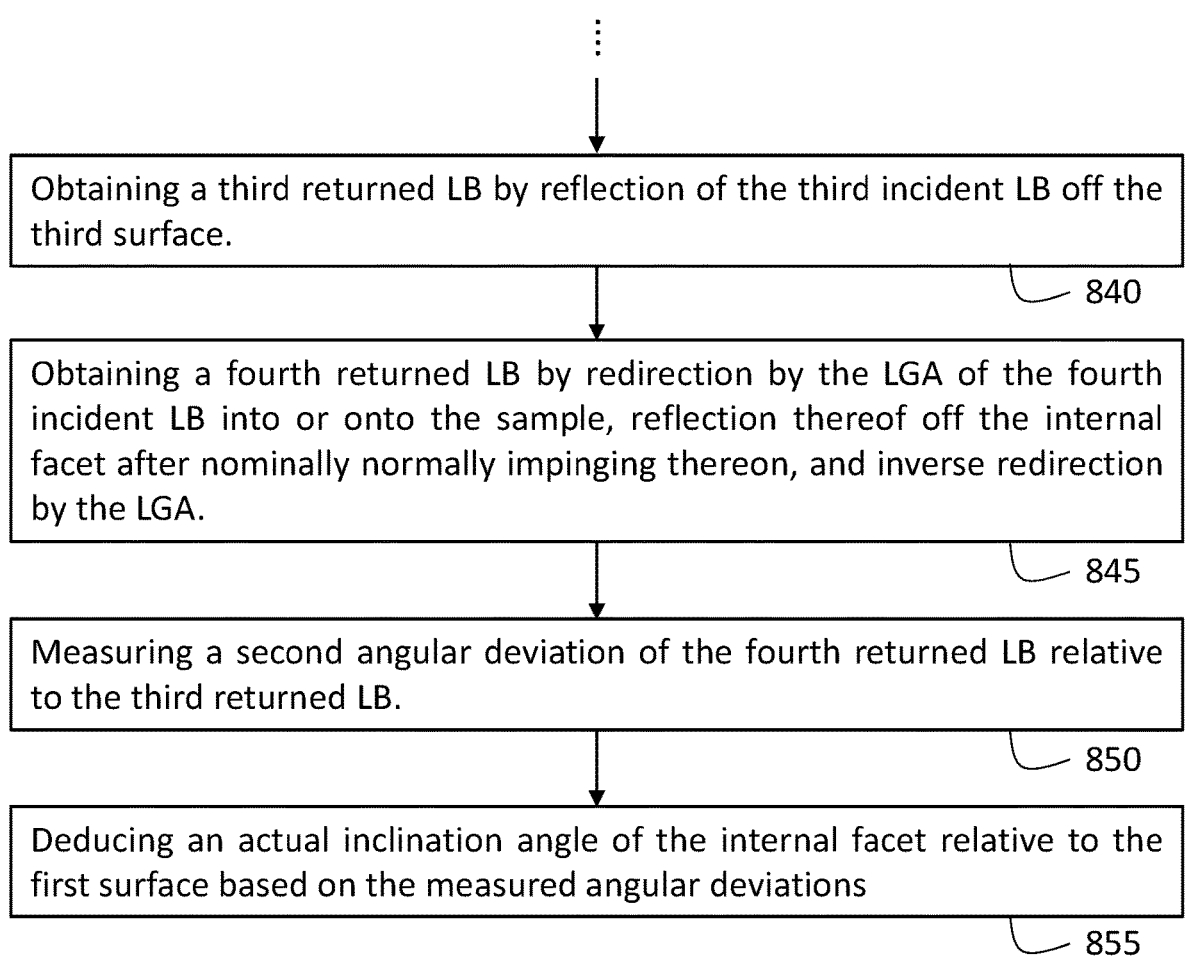

According to some embodiments, wherein sample 60 includes third surface 62*c*, which is opposite to first surface 62*a*, additional collective or individual information regarding the actual inclination angles of internal facets 64 may be obtained by flipping sample 60, such that the first surface 62*a* and third surface 62*c* are inverted and an orientation of second surface 62*b* relative to the LGA, used in performing the measurements, is maintained, and repeating the measurement, essentially as taught above in the description of system 500 and below in the description of the method of FIGS. 8A and 8B.

Methods

Figure 7:
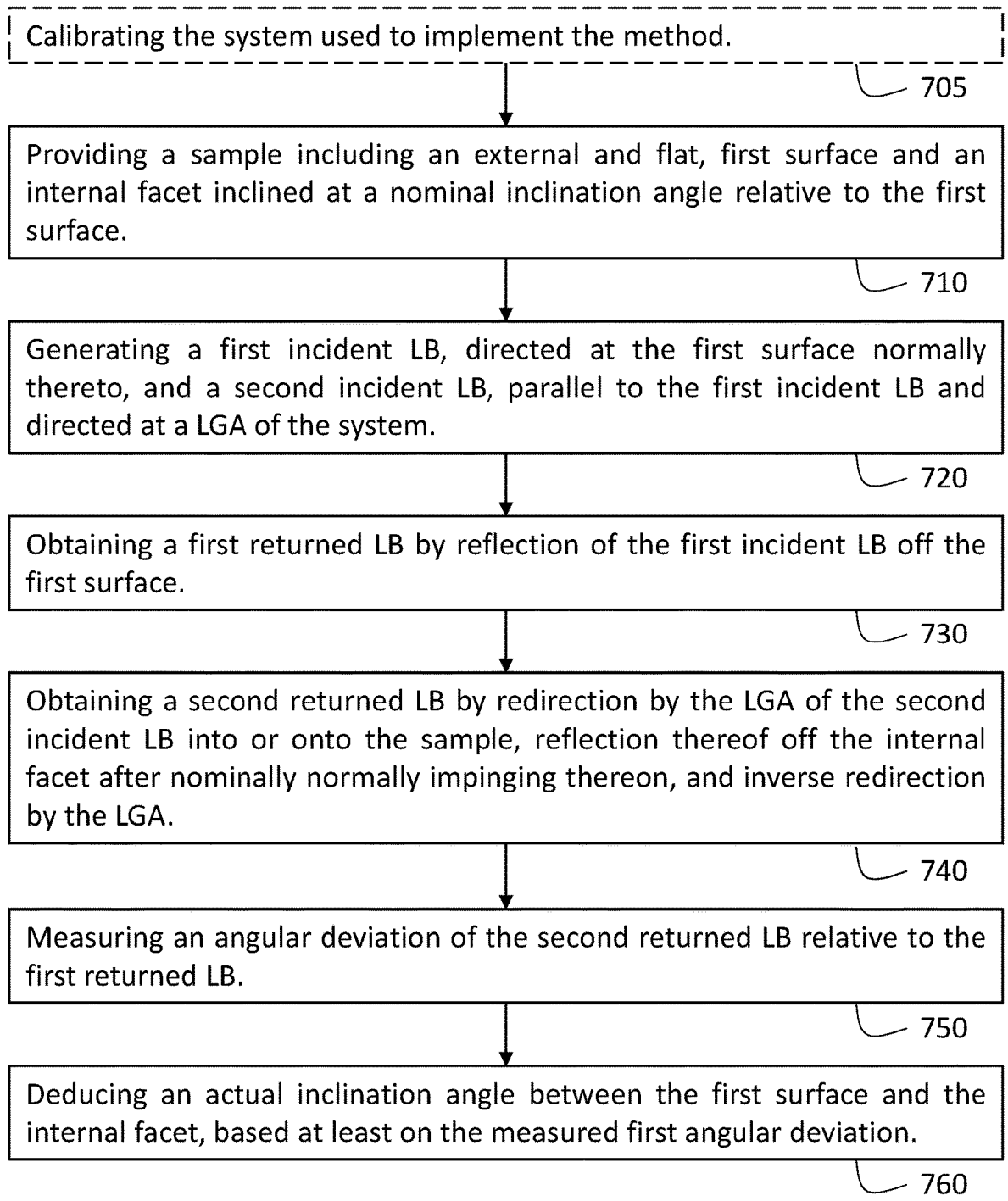
FIG. 7 presents a flowchart of an optical-based method for internal facet metrology of samples, according to some embodiments.

According to an aspect of some embodiments, there is provided an optical-based method for metrology of internal facets of samples. The method may be employed to validate an orientation of one or more internal facets of a sample relative to an external and flat surface of the sample. FIG. 7 presents a flowchart of such a method, an optical-based method 700, according to some embodiments. Method 700 may include:

An optional stage 705, wherein the system (e.g. system 100) used to implement the method is calibrated.

A stage 710, wherein a sample (e.g. sample 10), which is to be tested, is provided. The sample includes an external, flat first surface (a first external surface, which is flat; e.g. first surface 12*a*) and an internal facet (e.g. internal facet 14) nominally inclined at a nominal inclination angle (e.g. the nominal inclination angle $\alpha$) relative to the first surface.

A stage 720, wherein a pair of parallel light beams (LBs) are generated (e.g. by light source 112 and optical equipment 118 or by autocollimator 250): A first incident LB (e.g. first incident LB 105*a*) is projected on the first surface of the sample perpendicularly thereto. A second incident LB (e.g. second incident LB 105*b*) is projected on a light guiding arrangement (LGA; e.g. LGA 102) in parallel to the first incident LB.

A stage 730, wherein a first returned LB (e.g. first returned LB 133*a*) is obtained from a reflection of the first incident LB off the first surface of the sample.

A stage 740, wherein a second returned LB (e.g. second returned LB 133*b*) is obtained by redirection by the LGA of the second incident LB into or onto the sample, reflection thereof off the internal facet after nominally normally impinging on the internal facet, and inverse redirection by the LGA.

A stage 750, wherein an angular deviation of the second returned LB relative to the first returned LB is measured by sensing the first returned LB and the second returned LB (e.g. by sensor 114 or autocollimator 250).

A stage 760, wherein an actual inclination angle (e.g. the actual inclination angle $\alpha'$) of the internal facet relative to the first surface is deduced based at least on the measured angular deviation.

As used herein, the term "obtaining" may be employed both in an active and a passive sense. Thus, for example, in stage 730 the first returned LB may be obtained not due to any operation implemented in stage 730 but rather due to the generation of the first incident LB in stage 720. Generally, a stage may describe an active operation performed by a user or by the system used to implement the method, and/or the results or effects of one or more operations performed in one or more earlier stages.

Method 700 may be implemented employing an optical-based system, such as any one of optical-based systems 100, 200, and 300 or optical-based systems similar thereto, as described above in the respective descriptions thereof. In particular, according to some embodiments, method 700 may be autocollimator-based, based on the measurement of distance between laser beams, or may be based on interferometry, as detailed in the description of the various embodiments of system 100. In stage 730, the second incident LB may be nominally folded at the nominal inclination angle utilizing any one of LFC 122, LFC 222, and prism 322, or a similar function LFC. Similarly, the second returned LB may be obtained utilizing any one of LFC 122, LFC 222, and prism 322, or a like-function LFC. According to some embodiments, the internal facet may demarcate a flat boundary between a first part (e.g. first part 16*a*) and a second part (e.g. second part 16*b*) of the sample, which differ in their refractive indices. Alternatively, according to some embodiments, the internal facet may constitute a thin and flat and layer between a first part and a second part of the sample, which has a different refractive index than each of the first part and the second part (whose refractive indices may or may not be the same). The first part may extend between the internal facet and an external, flat second surface (e.g. second surface 12*b*) of the sample. In stage 740, a transmitted LB (e.g. transmitted LB 117*b*), which constitutes a portion of second incident LB transmitted into the sample, may enter thereinto via the second surface.

According to some embodiments, in stage 720 a collimated light beam, such as LB 201, may be generated, of which a first sub-beam and a second sub-beam constitute the first incident LB and the second incident LB, respectively. According to some embodiments, the first incident LB and the second incident LB may be adjacent. According to some embodiments, the first incident LB and the second incident LB may form complementary portions of the collimated light beam. Alternatively, according to some embodiments, the first incident LB and the second incident LB may be spaced apart, with a portion of the collimated light beam, which would have been positioned therebetween, having been removed (e.g. blocked, for example, using a light absorbing filter or an opaque plate). According to some embodiments, the collimated light beam may be generated using an autocollimator, such as autocollimator 250.

According to some embodiments, the LFC may be configured such that the light folding angle thereof is independent of a pitch angle at which the LFC is set (so that the second incident LB is nominally folded at the nominal inclination angle $\alpha$ irrespectively of the pitch angle). According to some such embodiments, the LFC may be a penta-prism or a like-function prism, or a pair of plane mirrors set at an angle relative to one another, or a like-function mirror arrangement, as described above in the Systems subsection in the description of systems 100 and 300.

According to some embodiments, the LGA may include, in addition to the LFC, a coupling infrastructure, such as coupling infrastructure 124. The coupling infrastructure is configured to guide light, nominally folded by the LFC (e.g. folded LB 113b) at the nominal inclination angle, into or onto to the sample, so that the transmitted light (e.g. transmitted LB 117b) nominally normally impinges on the internal facet.

According to some embodiments, the coupling infrastructure may include a coupling prism (CP), such as CP 132, and a shape-conforming interface, such as shape-conforming interface 134. Each of the CP and the shape-conforming interface may be characterized by refractive indices equal to, or close to equal to, the refractive index of the sample or at least the first part of the sample in embodiments wherein the first part and second part of the sample do not have the same refractive index. The CP includes an external and flat first surface (referred to as "CP first surface"), an external and flat second surface (referred to as "CP second surface"), and an external third surface (referred to as "CP third surface"), such as CP first surface 138a, CP second surface 138b, and CP third surface 138c, respectively. In particular, the CP second surface is nominally inclined at the nominal inclination angle a relative to the CP first surface.

The shape-conforming interface is disposed between the CP and the first part of the sample, adjacently to each, so as to define a continuum of materials having equal, or close to equal, refractive indices. More specifically, the shape-conforming interface is disposed between the CP third surface and the second surface of the sample with the CP and the sample being mutually aligned, such that the CP second surface and the internal facet of the sample are nominally parallel.

The forming of a continuum of materials having the same refractive indices, or close refractive indices, helps ensure that in stage 740 (i) the propagation direction of a light beam transmitted into the CP (e.g. transmitted LB 117b) is maintained on crossing from the CP into the shape-conforming interface, and, next, on crossing from the shape-conforming interface into the first part of the sample, and (ii) the propagation direction of the light beam reflected off the internal facet (e.g. reflected LB 121b) is maintained on crossing from the first part of the sample into the shape-conforming interface, and, next, on crossing from the shape-conforming interface into the CP. Advantageously, this helps ensure that a transmitted portion (e.g. transmitted LB 117b) of a light beam (e.g. folded LB 113b), which is normally incident on the CP second surface, will nominally normally impinge on the internal facet of the sample.

Thus, in embodiments including both the CP and shape-conforming interface, a folded LB (e.g. folded LB 113b)—obtained by the folding of the second incident LB by the LFC—impinges on the CP second surface nominally normally thereto and is (at least in part) transmitted into the CP. The transmitted LB (e.g. transmitted LB 117b) continuously travels across the CP, across the shape-conforming interface, and the first part of the sample. The transmitted LB nominally normally impinges on the internal facet and is reflected (at least in part) off the internal facet. The reflected LB (e.g. reflected LB 121b) travels back across the first part, the shape-conforming interface, and the CP. At least a portion (e.g. emerged LB 125b) of the reflected LB emerges from the CP in the direction of the LFC. The LFC nominally folds the emerged LB at the nominal inclination angle, thereby obtaining the second returned LB.

According to some embodiments, in stage 705, an additional incident LB (e.g. additional incident LB 205s) may be projected nominally normally to the CP first surface. The additional incident LB may be used to validate that the CP first surface and the first surface of the sample are aligned, for example, by measuring an angular deviation between an additional returned LB (e.g. additional returned LB 233s), obtained from the reflection of the additional incident LB off the CP first surface, and first returned LB.

According to some embodiments, in stage 705, "gold standard" (GS) samples may be employed as part of the calibration of the system used to implement method 700. More specifically, given a sample to be tested, a corresponding GS sample (i.e. a sample that is known to exhibit the requisite geometry to high precision and has the same refractive index as the sample to be tested) may be employed in calibrating the system. The GS sample may be employed to calibrate an orienting infrastructure (e.g. orienting infrastructure 140, orienting infrastructure 240) and the LGA, such that (i) the first incident will normally impinge on a first surface (analogous to first surface 12a) of the GS sample and (ii) the transmitted LB will (i.e. to a precision afforded by the GS sample and the LGA) perpendicularly impinge on an internal facet (analogous to internal facet 14) of the GS sample.

According to some embodiments, a (first) orientable stage (e.g. stage 142), on which the sample may be mounted, may be used to orient the GS sample relative to each of the LGA, as a whole or relative a single component thereof (for example, the CP), and the ICA. Additionally, or alternatively, a second orientable stage (e.g. second stage 144) may be used to orient the CP relative to the GS sample and the LFC. An autocollimator, whether part of the ICA (in embodiments wherein the system includes an autocollimator), or not included in the system, may be used to validate the perpendicularity of the transmitted LB.

According to some embodiments, calibration or additional calibration may be performed after stage 710, once the sample to be tested has been provided and disposed e.g. on the orientable stage. The additional calibration may include, for example, orienting or re-orienting the orientable stage, on which the sample to be tested is mounted, such that the first incident LB perpendicularly impinges on the first surface of the sample to be tested. According to some embodiments, in stage 750 an autocollimator (e.g. autocollimator 250, and, more generally, in embodiments wherein an autocollimator is used in preparing the incident LBs, that same autocollimator) may be employed to sense the first and second returned LBs (e.g. the striking locations thereof on a photosensitive surface of a sensor of the autocollimator), and thereby measured the angular deviation. According to some embodiments, blocking elements, such as shutters and/or spectral filters may be employed to selectively block (or at least partially block) each of the returned LBs, essentially as described above in the description of systems 100 and 200. Beyond facilitating the attribution of each of a pair of spots (on a photosensitive surface of a light or image sensor (e.g. sensor 114) utilized to sense the returned LBs) to the returned LB, which has formed the spot, the blocking of one returned LB, while sensing the other returned LB, may serve to increase measurement precision by attenuating the signal associated with stray light.

According to some embodiments, particularly embodiments wherein stages 710, 720, and 730 are implemented employing an autocollimator, such as autocollimator 250, in stage 740, the angular deviation $\tilde{\delta}$ of the second returned LB relative to the first returned LB may be computed via $\tilde{\delta}=(\tilde{u}_2-\tilde{u}_1)/\tilde{f}$. $\tilde{u}_1$ and $\tilde{u}_2$ are the horizontal coordinates of a first spot (e.g. first spot 247a) and a second spot formed (e.g.

second spot 247*b*) on the photosensitive surface (e.g. photosensitive surface 248) of the autocollimator by the first returned LB and the second returned LB, respectively. $\tilde{f}$ is the focal length of a collimating lens of the autocollimator.

In stage 750, the actual inclination angle $\tilde{\alpha}'$ may be computed using the laws of geometrical optics and, in particular, Snell's law (and taking into account the actual light folding angle of the LFC, the actual inclination angle of the CP second surface relative to the CP first surface, and the value of refractive index of the first part of the sample).

According to some embodiments, wherein the sample (e.g. sample 60) includes a plurality of internal facets (e.g. internal facets 64), nominally perpendicular to the first surface, and, except for the internal facets, the sample is further characterized by a uniform or close to uniform refractive index, in stage 740, a plurality of returned LBs is obtained by redirection by the LGA of the second incident LB into or onto the sample, reflection thereof off each of the internal facets, and inverse redirection by the LGA, essentially as described in the description of FIGS. 6A and 6B. In stage 750, a plurality of angular deviations of each of the plurality of returned LB s relative to the first returned LB is measured by sensing the first returned LB and each of the plurality of returned LBs. According to some such embodiments, in stage 760, actual inclination angles of each of the plurality of internal facets relative to the first surface may be deduced based at least on the plurality of measured angular deviations. According to some embodiments, each of the spots, formed by the plurality of returned LBs on a photosensitive surface of a sensor (e.g. sensor 614), may be attributed to a respective one of the plurality of returned LBs based on relative brightness of the spots, and/or—in embodiments wherein each of the internal facets is configured to reflect light at a respective distinct spectrum—employing spectral filters. Additionally, or alternatively, according to some embodiments, collective information regarding the actual inclination angles (such as the mean actual inclination angle) is deduced based at least on the plurality of measured angular deviations.

FIGS. 8A and 8B present a flowchart of an optical-based method 800 for metrology of internal facets of samples, according to some embodiments. Method 800 corresponds to specific embodiments of method 700 and may be employed to validate perpendicularity of one or more internal facets of a sample relative to at least two external and flat surfaces of the sample, which are parallel to one another. Method 800 may include:

A stage 805, wherein a sample (e.g. sample 50) to be tested is provided. The sample includes an external, flat first surface (i.e. a first external surface, which is flat; e.g. first surface 52*a*), an external second surface (i.e. a second external, which may or may not be flat; e.g. second surface 52*b*), an external, flat third surface (i.e. a third external surface, which is flat; e.g. third surface 52*c*) parallel to the first surface, and an internal facet nominally inclined at 90° relative to the first surface.

A stage 810, wherein a first pair of parallel LBs are generated (e.g. by light source 512 and, optionally, optical equipment 518): A first incident LB (e.g. first incident LB 505*a*) is projected on the first surface of the sample perpendicularly thereto. A second incident LB (e.g. second incident LB 505*b*) is projected on the LGA (in parallel to the first incident LB).

A stage 815, wherein a first returned LB (e.g. first returned LB 533*a*) is obtained from a reflection of the first incident LB off the first surface.

A stage 820, wherein a second returned LB (e.g. second returned LB 533*b*) is obtained by redirection by the LGA of the second incident LB into or onto the sample, reflection thereof off the internal facet after nominally normally impinging on the internal facet, and inverse redirection by the LGA.

A stage 825, wherein a (first) angular deviation of the second returned LB relative to the first returned LB is measured by sensing the first returned LB and the second returned LB (e.g. by sensor 514).

A stage 830, wherein the sample is flipped, so as to invert the first and third surfaces (while maintaining a nominal orientation of the internal facet relative to the LGA).

A stage 835, wherein a second pair of parallel LBs are generated (e.g. by light source 512 and, optionally, optical equipment 518): A third incident LB (e.g. third incident LB 505*a'*) is projected on the third surface of the sample perpendicularly thereto. A fourth incident LB (e.g. fourth incident LB 505*b'*) is projected on the LGA (in parallel to the third incident LB).

A stage 840, wherein a third returned LB (e.g. third returned LB 533*a'*) is obtained from a reflection of the third incident LB off the third surface.

A stage 845, wherein a fourth returned LB (e.g. fourth returned LB 533*b'*) is obtained by redirection by the LGA of the fourth incident LB into or onto the sample, reflection thereof off the internal facet after nominally normally impinging on the internal facet, and inverse redirection by the LGA.

A stage 850, wherein a (second) angular deviation of the fourth returned LB relative to the third returned LB is measured by sensing the third returned LB and the fourth returned LB (e.g. by sensor 514).

A stage 855, wherein an actual inclination angle of the internal facet relative to the first surface is deduced based on the measured angular deviations.

Method 800 may be implemented employing an optical-based system, such as optical-based system 500 or an optical-based system similar thereto, as described above in the description of FIGS. 5A-5D. In particular, according to some embodiments, method 800 may be autocollimator-based, based on the measurement of distance between laser beams, or based on interferometry. In stage 820, the first folded LB and the second returned LB may be obtained from the second incident LB and the first reflected LB, respectively, utilizing a LFC configured to nominally fold by 90° light incident thereon, such as LFC 522 or a like-function LFC. According to some embodiments, the LFC may be or include a prism (e.g. a pentaprism) configured to fold light by 90°, or one or more mirrors (jointly) configured to fold light by 90° Similarly, in stage 845, the second folded LB and the fourth returned LB may be obtained from the fourth incident LB and the second reflected LB, respectively, utilizing LFC 522 or a like-function LFC.

According to some embodiments, the LGA may include, in addition to the LFC, a coupling infrastructure, such as coupling infrastructure 524. The coupling infrastructure is configured to guide light, folded by the LFC (e.g. folded LB 513*b*), into or onto to the sample, so that the transmitted light (e.g. transmitted LB 517*b*) nominally normally impinges on the internal facet.

According to some embodiments, the coupling infrastructure may include a coupling prism (CP), such as CP 532, and a shape-conforming interface, such as shape-conforming interface 534. Each of the CP and the shape-conforming interface are characterized by a respective refractive index equal to, or close to equal to, that of the sample or at least the first part of the sample in embodiments wherein the first part and second part of the sample do not have the same refractive index. The CP includes an external and flat first surface (referred to as "CP first surface"), an external and flat second surface (referred to as "CP second surface"), and an external third surface (referred to as "CP third surface"), such as CP first surface 538a, CP second surface 538b, and CP third surface 538c, respectively. In particular, the CP second surface is nominally perpendicularly inclined relative to the CP first surface. The CP and shape-conforming interface may be utilized essentially as described above in the description of method 700, and, optionally, additionally utilized as described below.

According to some embodiments, the CP includes an external and flat fourth surface (referred to "CP fourth surface"), such as CP fourth surface 538d. The CP fourth surface is opposite and parallel to the CP first surface. In such embodiments, in stage 830, the CP may also be flipped, such that the CP first surface and the CP fourth surface, with a nominal orientation of the CP second surface (through which the light, folded by the LFC, enters into the CP) relative to the internal facet being maintained. According to some embodiments, in stages 810 and 835, an autocollimator (e.g. autocollimator) may be used to generate the pairs of parallel incident LBs. According to some embodiments, in stages 815, 820, 840, and 845 an autocollimator (e.g. the autocollimator used in preparing the incident LBs) may be employed to sense the returned LBs. According to some embodiments, shutters and/or spectral filters may be employed to selectively block (or at least partially block) one of the second returned LB and the first returned LB, and one of the fourth returned LB and the third returned LB, essentially as described above in the description of FIGS. 5A and 5B.

According to some embodiments, method 800 may include an optional calibration stage (not shown in FIGS. 8A and 8B) similar to stage 705 of method 700, and which is (partially) repeated after flipping the sample in stage 830 (and performed before stages 835 to 855). More specifically, in stage 830, after the sample is flipped, the orientation of the sample may be reoriented, such that light transmitted into the sample is incident on the internal facet nominally perpendicularly thereto. In embodiments, wherein the CP is also flipped, the CP may also be reoriented, such that light folded by the LFC (e.g. second folded LB 513b') will nominally perpendicularly impinge on the CP second surface.

According to some embodiments, particularly embodiments wherein stages 810, 815, 820, 835, 840, and 845 are implemented employing an autocollimator (such as autocollimator 250), in stage 825, the first angular deviation $\tilde{\delta}_1$ of the second returned LB relative to the first returned LB is obtained via $\tilde{\delta}_1=(\tilde{w}_2-\tilde{w}_1)/\tilde{f}_0 \cdot \tilde{w}_1$ and $\tilde{w}_2$ are the horizontal coordinates of a first spot and a second spot (e.g. first spot 547a and second spot 547b) formed on the photosensitive surface (e.g. photosensitive surface 548) of the autocollimator by the first returned LB and the second returned LB, respectively. $\tilde{f}_0$ is the focal length of a collimating lens of the autocollimator. Similarly, in stage 850, the second angular deviation $\tilde{\delta}_2$ of the fourth returned LB relative to the third returned LB is obtained via $\tilde{\delta}_1=(\tilde{w}_2'-\tilde{w}_1')/\tilde{f}_0 \cdot \tilde{w}_1'$ and $\tilde{w}_2'$ are the horizontal coordinates of a third spot and a fourth spot (e.g. third spot 547a' and fourth spot 547b') formed on the photosensitive surface of the autocollimator by the third returned LB and the fourth returned LB, respectively.

In stage 855, the value of the actual inclination angle $\tilde{\varkappa}'$ (or more precisely, the average value obtained from averaging over the two obtained estimates) may obtained from the (measured values of the) angular deviations $\tilde{\delta}_1$ and $\tilde{\delta}_2$ via the relation $\langle \tilde{\varkappa}' \rangle = 90° - \langle \Delta\tilde{\varkappa}' \rangle = \tilde{\varkappa} + (\tilde{\delta}_1' - \tilde{\delta}_2)/(4\tilde{n}') + \Delta\tilde{\varkappa}''' \cdot (\tilde{n}' - 1)$ $\tilde{n}' \cdot \tilde{n}'$ is the refractive index of the first part of the sample (as well as the CP and the shape-conforming interface or is at least close to the respective refractive indices thereof).

According to some embodiments, wherein the sample (e.g. sample 60) includes a plurality of internal facets (e.g. internal facets 64), nominally perpendicular to the first surface, and, except for the internal facets, the sample is further characterized by a uniform or close to uniform refractive index, in stage 820, a first plurality of returned LBs is obtained by redirection by the LGA of the second incident LB into or onto the sample, reflection thereof off each of the internal facets, and inverse redirection by the LGA, essentially as described in the description of FIGS. 6A and 6B. In stage 825, a first plurality of angular deviations of each of the first plurality of returned LBs relative to the first returned LB is measured by sensing the first returned LB and each of the first plurality of returned LBs. Similarly, in stage 845, a second plurality of returned LBs is obtained by redirection by the LGA of the fourth incident LB into or onto the sample, reflection thereof off each of the internal facets, and inverse redirection by the LGA. In stage 850, a second plurality of angular deviations of each of the second plurality of returned LBs relative to the third returned LB is measured by sensing the third returned LB and each of the second plurality of returned LBs. According to some such embodiments, in stage 855, actual inclination angles of each of the plurality of internal facets relative to the first surface may be deduced based on the first plurality of measured angular deviations and the second plurality of measured angular deviations. According to some embodiments, each of the spots formed by the plurality of returned LBs may be attributed to a respective one of the plurality of returned LBs based on relative brightness of the spots, and/or—in embodiments wherein each of the internal facets is configured to reflect light at a respective distinct spectrum—employing spectral filters. Additionally, or alternatively, according to some embodiments, collective information regarding the actual inclination angles (such as the mean actual inclination angle) is deduced based at on the first and second pluralities of measured angular deviations.

According to some embodiments, wherein when the sample is flipped, such that the first and third surfaces thereof are inverted, and such that orientation of the internal facet relative to the LGA is maintained, and, in addition, the internal facet remains nominally parallel to the CP second surface (when the CP is not flipped), then method 800 may additionally include four measurements instead: a first measurement with both the sample and the CP unflipped, a second measurement with the sample unflipped and the CP flipped, a third measurement with both the sample and the CP flipped, and a fourth measurement with the sample flipped and the CP unflipped. The four measurements may increase measurement precession by effectively canceling out the contribution of $\Delta\tilde{\varkappa}'''$ to $\langle \tilde{\varkappa}' \rangle$. A non-limiting example of such a sample, is sample 40 in FIG. 4A, according to some specific embodiments thereof wherein sample 40 further comprises an external and flat surface opposite to first surface 42a.

Additional Systems

Figure 9:
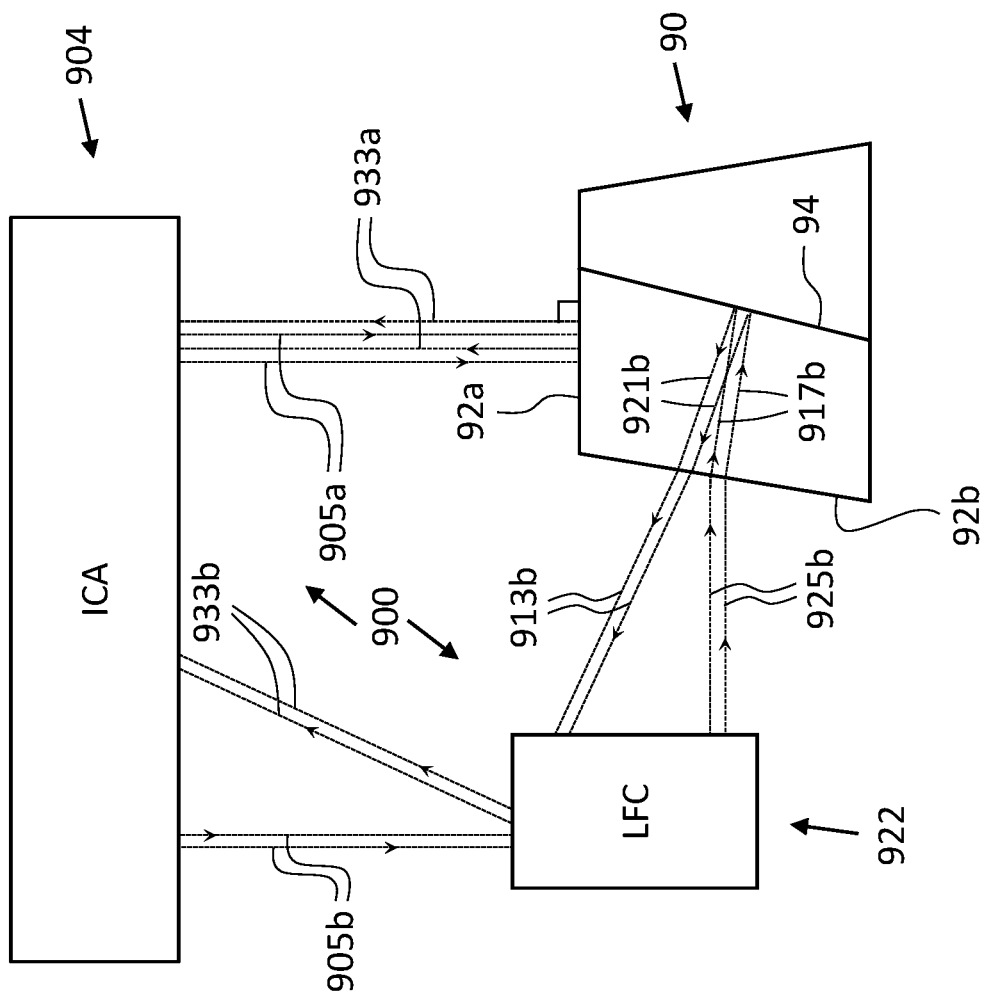
FIG. 9 schematically depicts an optical-based system for internal facet metrology of samples, during inspection of a sample, according to some embodiments.

FIG. 9 schematically depicts an optical-based system 900 for internal facet metrology of samples, according to some embodiments, System 900 is similar to system 100 but unlike some embodiments of system 100, does not include any coupling infrastructure (such as coupling infrastructure 124). System 900 is configured for use with samples including at least two external and flat surfaces and an internal facet, which is nominally inclined at a nominal inclination angle relative to a first of the two surfaces. Such a sample, a sample 90, is depicted in FIG. 9, according to some embodiments. Sample 90 includes an external, flat first surface 92*a*, and external, flat second surface 92*b*, and an internal facet 94. Internal facet 94 is nominally inclined at a nominal inclination angle ω relative to first surface 92*a*. Sample 90 is shown being inspected by system 900.

System 900 includes an ICA 904 and a LFC 922, which may correspond to specific embodiments of ICA 104 and LFC 122, respectively. ICA 904 may include a light source, at least one sensor, and, optionally, optical equipment (all not shown), which may correspond to specific embodiments of light source 112, at least one sensor 114, and optical equipment 118, respectively. System 900 may further include a controller, an orientable stage, and a computational module (all not shown), which may correspond to specific embodiments of controller 108, first stage 142, and computational module 130. The controller may be functionally associated with ICA 904 components, the stage, and the computational module in a similar manner to controller 108 functional association with ICA 104 components, first stage 142, and computational module 130, respectively.

In operation, ICA 904 generates a pair of incident LBs: a first incident LB 905*a* and a second incident LB 905*b*, which is parallel to first incident LB 905*a*. First incident LB 905*a* is projected nominally normally to first surface 92*a*. A first returned LB 933*a* is obtained by reflection of first incident LB 905*a* off first surface 92*a* and is sensed by a sensor (not shown) of ICA 904.

Second incident LB 905*b* is folded by LFC 922, as indicated by a folded LB 913*b*. Folded LB 913*b* impinges on second surface 92*b*. A transmitted LB 917*b* indicates a portion of folded LB 913*b*, which is transmitted into sample 90. Transmitted LB 917*b* nominally normally impinges on internal facet 94. That is, a nominal folding angle of LFC 922 and an orientation of sample 90 relative to LFC 922 are selected such that transmitted LB 917*b* will nominally normally impinge on internal facet 94.

A reflected LB 921*b* indicates a portion of transmitted LB 917*b*, which is specularly reflected off internal facet 94. An emerged LB 925*b* indicates a portion of reflected LB 921*b*, which exits sample 90 by refraction via second surface 92*b*. Second returned LB 933*b* is obtained by the folding of emerged LB 925*b* by LFC 922. Second returned LB 933*b* is sensed by the sensor of ICA 904.

According to some embodiments, the angular deviation of second returned LB 933*b* relative to first returned LB 933*a* may be obtained from the horizontal distance between a second spot and a first spot formed by second returned LB 933*b* and first returned LB 933*a*, respectively, on the photosensitive surface of the sensor, as described above in the descriptions of system 100 and method 700. From the measured value of the angular deviation, a deviation in the (actual) inclination of internal facet 94 from the nominal inclination thereof may be derived, essentially as described in the descriptions of system 100 and method 700.

Figure 10:
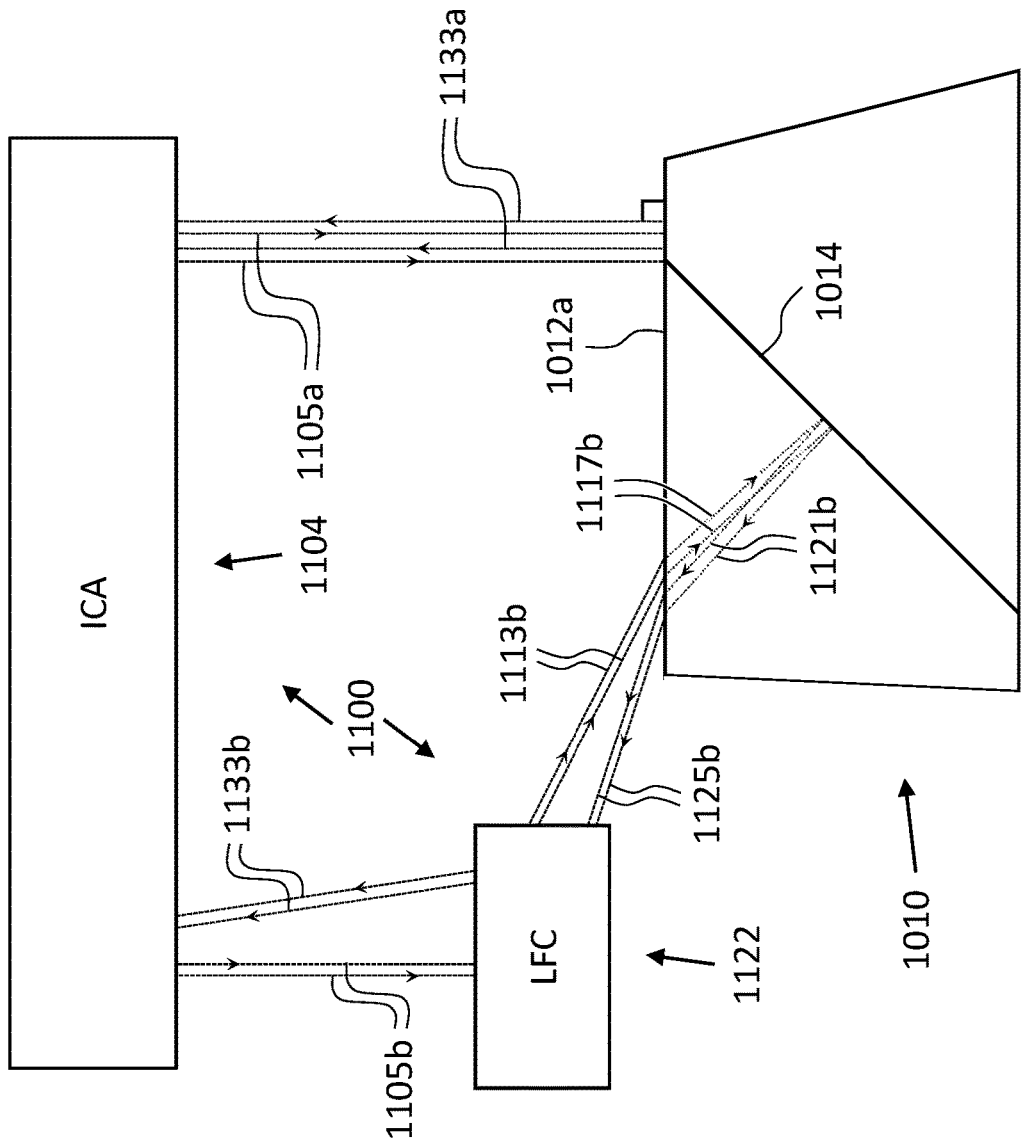
FIG. 10 schematically depicts an optical-based system for internal facet metrology of samples, during inspection of a sample, according to some embodiments.

FIG. 10 schematically depicts an optical-based system 1100 for internal facet metrology of samples, according to some embodiments, System 1100 is configured for use with samples including an external and flat surface and an internal facet, which is nominally inclined at a nominal inclination angle relative to the surface. Such a sample, a sample 1010, is depicted in FIG. 10, according to some embodiments. Sample 1010 includes an external, flat (first) surface 1012*a* and an internal facet 1014. Internal facet 1014 is nominally inclined at a nominal inclination angle ω' relative to first surface 1012*a*. Sample 1010 is shown being inspected by system 1100.

System 1100 includes an ICA 1104 and a LFC 1122, which may be similar to ICA 104 and LFC 122, respectively, but differ therefrom as described below. ICA 1104 may include a light source, at least one sensor, and, optionally, optical equipment (all not shown), which may be similar to light source 112, at least one sensor 114, and optical equipment 118, respectively. System 1100 may further include a controller and a computational module (all not shown), which may correspond to specific embodiments of controller 108 and computational module 130. The controller may be functionally associated with ICA 1104 components and the computational module in a similar manner to controller 108 functional association with ICA 104 components and computational module 130, respectively. System 1100 may further include an orientable stage (not shown), which may be similar to first stage 142, and which may be controlled by the controller.

In operation, ICA 1104 generates a pair of incident LBs: a first incident LB 1105*a* and a second incident LB 1105*b*, which is parallel to first incident LB 1105*a*. First incident LB 1105*a* is projected nominally normally to first surface 1012*a*. A first returned LB 1133*a* is obtained by reflection of first incident LB 1105*a* off first surface 1012*a* and is sensed by a sensor (not shown) of ICA 1104.

Second incident LB 1105*b* is folded by LFC 1122, as indicated by a folded LB 1113*b*. Folded LB 1113*b* impinges on first surface 1012*a*. A transmitted LB 1117*b* indicates a portion of folded LB 1113*b*, which is refracted into sample 1000. Transmitted LB 1117*b* nominally normally impinges on internal facet 1014. That is, a nominal folding angle of LFC 1122 and an orientation of sample 1000 relative to LFC 1122 are selected such that transmitted LB 1117*b* will nominally normally impinge on internal facet 1014.

A reflected LB 1121*b* indicates a portion of transmitted LB 1117*b*, which is specularly reflected off internal facet 1014. An emerged LB 1125*b* indicates a portion of reflected LB 1121*b*, which exits sample 1000 by refraction via first surface 1012*a*. Second returned LB 1133*b* is obtained by the folding of emerged LB 1125*b* by LFC 1122. Second returned LB 1133*b* is sensed by the sensor of ICA 1104.

According to some embodiments, the angular deviation of second returned LB 1133*b* relative to first returned LB 1133*a* may be obtained from the horizontal distance between a second spot and a first spot formed by second returned LB 1133*b* and first returned LB 1133*a*, respectively, on the photosensitive surface of the sensor, as described above in the descriptions of system 100 and method 700. From the measured value of the angular deviation, a deviation in the (actual) inclination of internal facet 1014 from the nominal inclination thereof may be derived, in a similar manner to the derivation of the actual inclination angle α' from the angular deviation δ (described above in the description of system 100 and method 700).

According to some embodiments, the nominal folding angle of LFC 1122 may be selected such that an intensity of second returned LB 1133*b* is maximized.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out and/or occurring in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. An optical-based method for validating an orientation of one or more internal facets of a sample relative to an external, flat first surface thereof, the method comprising:
    providing a sample comprising the external, flat first surface and an internal facet nominally inclined at a nominal inclination angle p relative to the first surface;
    providing a light guiding arrangement (LGA) configured to redirect light, which is incident on the LGA in a direction perpendicular to the first surface, into or onto the sample, such that light, transmitted thereby into the sample, impinges on the internal facet nominally normally to the internal facet;
    generating a first incident light beam (LB), directed at the first surface normally thereto, and a second incident LB, parallel to the first incident LB and directed at the LGA; obtaining a first returned LB by reflection of the first incident LB off the first surface; obtaining a second returned LB by redirection by the LGA of the second incident LB into or onto the sample, reflection thereof off the internal facet, and inverse redirection by the LGA;
    measuring a first angular deviation of the second returned LB relative to the first returned LB; and
    deducing an actual inclination angle p' of the internal facet relative to the first surface, based at least on the measured first angular deviation.

2. The optical-based method of claim 1, wherein the first angular deviation is obtained from measured coordinates of a first spot and a second spot formed by the first returned LB and the second returned LB, respectively, on a photosensitive surface of a light or image sensor.

3. The optical-based method of claim 1, wherein the sample comprises k>1 additional internal facets nominally parallel to the internal facet;
    wherein in the obtaining of the second returned LB, k additional returned LBs are obtained by reflection of k LBs off of each of the k additional internals facets, respectively, the k LBs jointly constituting a portion of the second incident LB, transmitted into the sample and further transmitted via the internal facet;
    wherein in the measuring of the first angular deviation, k additional angular deviations of the k additional returned LBs relative to the first returned LB are measured; and
    wherein in deducing the actual inclination angle p' of the internal facet, (i) k additional actual inclination angles of each of the k additional internal facets are additionally deduced, and/or (ii) an average actual inclination angle equal to, or about equal to, an average over the actual inclination angles of the internal facet and the k additional internal facets, is deduced, the average actual inclination angle being indicative of the actual inclination angle p' of the internal facet.

4. The optical-based method of claim 3, wherein k>2, wherein a first of the additional internal facets is positioned between the internal facet and a second of the additional internal facets, and wherein, for each m such that 2<m <k−1, an m-th of the k additional internal facets is positioned between an (m−1)-th and an (m+1)-th of the k additional internal facets.

5. The optical-based method of claim 3, wherein each of the internal facet and the k additional internal facets is configured to reflect light at a respective spectrum, each spectrum being distinct from the other spectra, so as to allow distinguishing between each of the second returned LB and the k additional returned LBs.

6. The optical-based method of claim 1, wherein the sample comprises a first part and a second part, between which the internal facet extends, wherein the first part is positioned between an external second surface of the sample and the internal facet, and wherein a transmitted LB, constituting a portion of the second incident LB, which is directly or indirectly transmitted into the sample, enters into the sample via the second surface.

7. The optical-based method of claim 6, wherein the sample comprises k>1 additional internal facets nominally parallel to the internal facet;
    wherein in the obtaining of the second returned LB, k additional returned LBs are obtained by reflection of k LBs off of each of the k additional internals facets, respectively, the k LBs jointly constituting a portion of the second incident LB, transmitted into the sample and further transmitted via the internal facet;
    wherein in the measuring of the first angular deviation, k additional angular deviations of the k additional returned LBs relative to the first returned LB are measured; and
    wherein in deducing the actual inclination angle p' of the internal facet, (i) k additional actual inclination angles of each of the k additional internal facets are additionally deduced, and/or (ii) an average actual inclination angle equal to, or about equal to, an average over the actual inclination angles of the internal facet and the k additional internal facets, is deduced, the average actual inclination angle being indicative of the actual inclination angle p' of the internal facet.

8. The optical-based method of claim 6, wherein the sample is a prism, a waveguide, or a beam splitter.

9. The optical-based method of claim 6, wherein the LGA comprises a light folding component (LFC) nominally configured to fold light, at least when projected thereon in a direction perpendicular to the first surface, at a light folding angle equal to the nominal inclination angle.

10. The optical-based method of claim 9, wherein the sample comprises k>1 additional internal facets nominally parallel to the internal facet;
wherein in the obtaining of the second returned LB, k additional returned LBs are obtained by reflection of k LBs off of each of the k additional internals facets, respectively, the k LBs jointly constituting a portion of the second incident LB, transmitted into the sample and further transmitted via the internal facet;
wherein in the measuring of the first angular deviation, k additional angular deviations of the k additional returned LBs relative to the first returned LB are measured; and
wherein in deducing the actual inclination angle p' of the internal facet, (i) k additional actual inclination angles of each of the k additional internal facets are additionally deduced, and/or (ii) an average actual inclination angle equal to, or about equal to, an average over the actual inclination angles of the internal facet and the k additional internal facets, is deduced, the average actual inclination angle being indicative of the actual inclination angle p' of the internal facet.

11. The optical-based method of claim 9, wherein the LFC is or comprises a prism, one or more mirrors, and/or a diffraction grating.

12. The optical-based method of claim 11, wherein the light folding angle is insensitive to variations in a pitch of the prism.

13. The optical-based method of claim 12, wherein the LFC is or comprises a pentaprism, or a pair of mirrors set at an angle relative to one another.

14. The optical-based method of claim 9, wherein the LGA further comprises a coupling infrastructure configured to guide the light, folded by LFC, onto or into the sample, such that light, transmitted thereby into the sample, nominally normally impinges on the internal facet.

15. The optical-based method of claim 14, wherein the coupling infrastructure comprises a coupling prism (CP), comprising an external, flat CP first surface, an external, flat CP second surface, nominally inclined at a nominal angle relative to the CP first surface, and an external CP third surface, opposite the CP second surface;
wherein the CP has a same refractive index as the first part of the sample or a refractive index close thereto; and
wherein the CP is disposed such that the CP first surface is parallel to the first surface of the sample, and is further oriented such that the light, folded by the LFC, nominally normally impinges on the CP second surface.

16. The optical-based method of claim 15, further comprising an initial calibration stage wherein a gold standard sample is utilized to calibrate orientations of the LFC, the CP, and/or the sample; and generating an additional incident LB, which is directed at the CP first surface and in parallel to the first incident LB, and, wherein, an orientation of the CP is (a) calibrated and/or (b) tested for correct orientation during the measurement of the first angular deviation, by measuring an additional angular deviation of an additional returned LB relative to the first returned LB, the additional returned LB being obtained by reflection of the additional incident LB off the first CP surface.

17. The optical-based method of claim 15, wherein the coupling infrastructure includes the CP, and wherein the actual inclination angle of the internal facet relative to the first surface is obtained from the measured first angular deviation taking into account the-values of an actual inclination angle of the CP second surface relative to the CP first surface, and the refractive index of the first part of the sample, and, optionally, an actual light folding angle of the LFC.

18. The optical-based method of claim 15, wherein the coupling infrastructure further comprises a shape conforming interface, which is disposed between the CP third surface and the sample and has been made to assume a shape such that the CP first surface is parallel to the first surface of the sample.

19. The optical-based method of claim 18, wherein the shape conforming interface has a same refractive index as the first part of the sample or a refractive index close thereto.

20. The optical-based method of claim 18, wherein the shape conforming interface is or comprises a liquid and/or a gel.

* * * * *